(12) United States Patent
Hamano et al.

(10) Patent No.: US 9,998,652 B2
(45) Date of Patent: Jun. 12, 2018

(54) FOCUSING ADJUSTMENT APPARATUS AND FOCUSING ADJUSTMENT METHOD

(71) Applicant: CANON KABUSHIKI KAISHA, Tokyo (JP)

(72) Inventors: Hideyuki Hamano, Kawasaki (JP); Yumi Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/351,118

(22) Filed: Nov. 14, 2016

(65) Prior Publication Data

US 2017/0064193 A1 Mar. 2, 2017

Related U.S. Application Data

(63) Continuation of application No. 14/603,214, filed on Jan. 22, 2015, now Pat. No. 9,843,710.

(30) Foreign Application Priority Data

Jan. 23, 2014 (JP) .................................. 2014-010702

(51) Int. Cl.
| | |
|---|---|
| *H04N 5/357* | (2011.01) |
| *H04N 5/232* | (2006.01) |
| *H04N 5/374* | (2011.01) |
| *H04N 9/04* | (2006.01) |
| *G03B 13/36* | (2006.01) |
| *H04N 101/00* | (2006.01) |

(52) U.S. Cl.
CPC ......... *H04N 5/23212* (2013.01); *G03B 13/36* (2013.01); *H04N 5/357* (2013.01); *H04N 5/3572* (2013.01); *H04N 9/045* (2013.01); *H04N 2101/00* (2013.01)

(58) Field of Classification Search
CPC .... H04N 5/357; H04N 5/23212; H04N 9/045; H04N 5/374; G03B 13/36
USPC .......... 348/345, 346–350, 355; 359/16, 637; 396/79, 121
See application file for complete search history.

(56) References Cited

U.S. PATENT DOCUMENTS

| | | | |
|---|---|---|---|
| 6,363,220 B1 * | 3/2002 | Ide .......................... | G03B 13/36 396/98 |
| 2008/0309771 A1 * | 12/2008 | Takahashi ................ | G02B 7/34 348/208.4 |

(Continued)

*Primary Examiner* — Lin Ye
*Assistant Examiner* — Marly Camargo
(74) *Attorney, Agent, or Firm* — Canon U.S.A., Inc. IP Division

(57) ABSTRACT

A focusing adjustment apparatus includes a focusing unit, a first acquisition unit, a second acquisition unit, and a control unit. The focusing unit outputs a first signal for a focusing operation. The first acquisition unit acquires first information, which is related to characteristics of a signal used for outputting the first signal, and second information, which is related to characteristics of a captured image and is predetermined. The second acquisition unit acquires third information on aberrations of an imaging optical system. The control unit calculates a correction value based on the first information, the second information, and the third information. By using the correction value, the control unit changes the first signal, output from the focusing unit, to a second signal used in the focusing operation.

21 Claims, 19 Drawing Sheets

(56) References Cited

U.S. PATENT DOCUMENTS

| | | | | |
|---|---|---|---|---|
| 2009/0256952 A1* | 10/2009 | Kusaka | ................. | G02B 27/16 348/349 |
| 2010/0013947 A1* | 1/2010 | Oikawa | .............. | H04N 5/23212 348/222.1 |
| 2010/0194966 A1* | 8/2010 | Abe | ........................ | G02B 7/38 348/345 |
| 2012/0274837 A1* | 11/2012 | Yamasaki | .............. | G02B 7/285 348/360 |
| 2014/0036134 A1* | 2/2014 | Miyatani | ............ | H04N 5/23212 348/345 |
| 2014/0340567 A1* | 11/2014 | Fukuda | .............. | H04N 5/23212 348/353 |

* cited by examiner

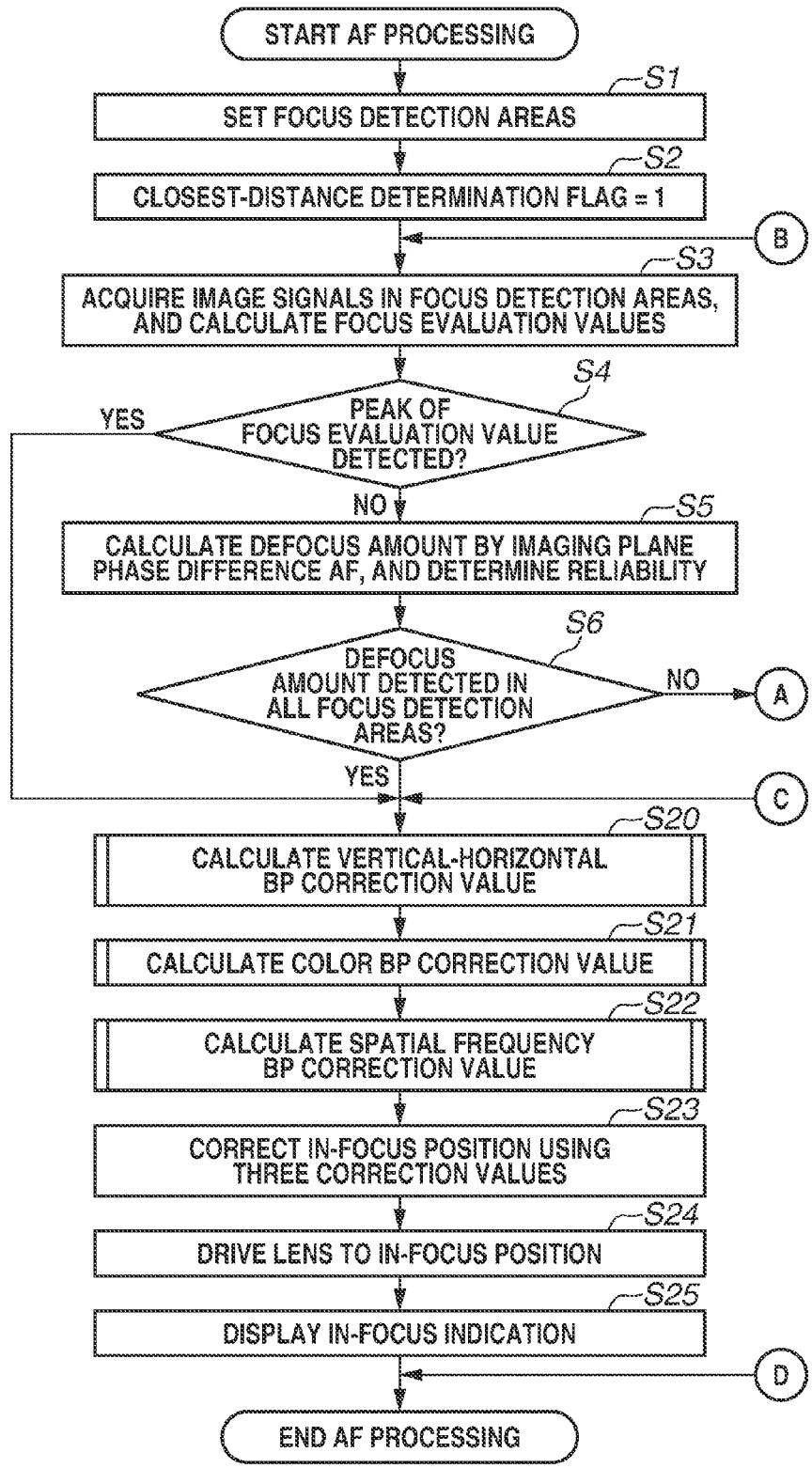

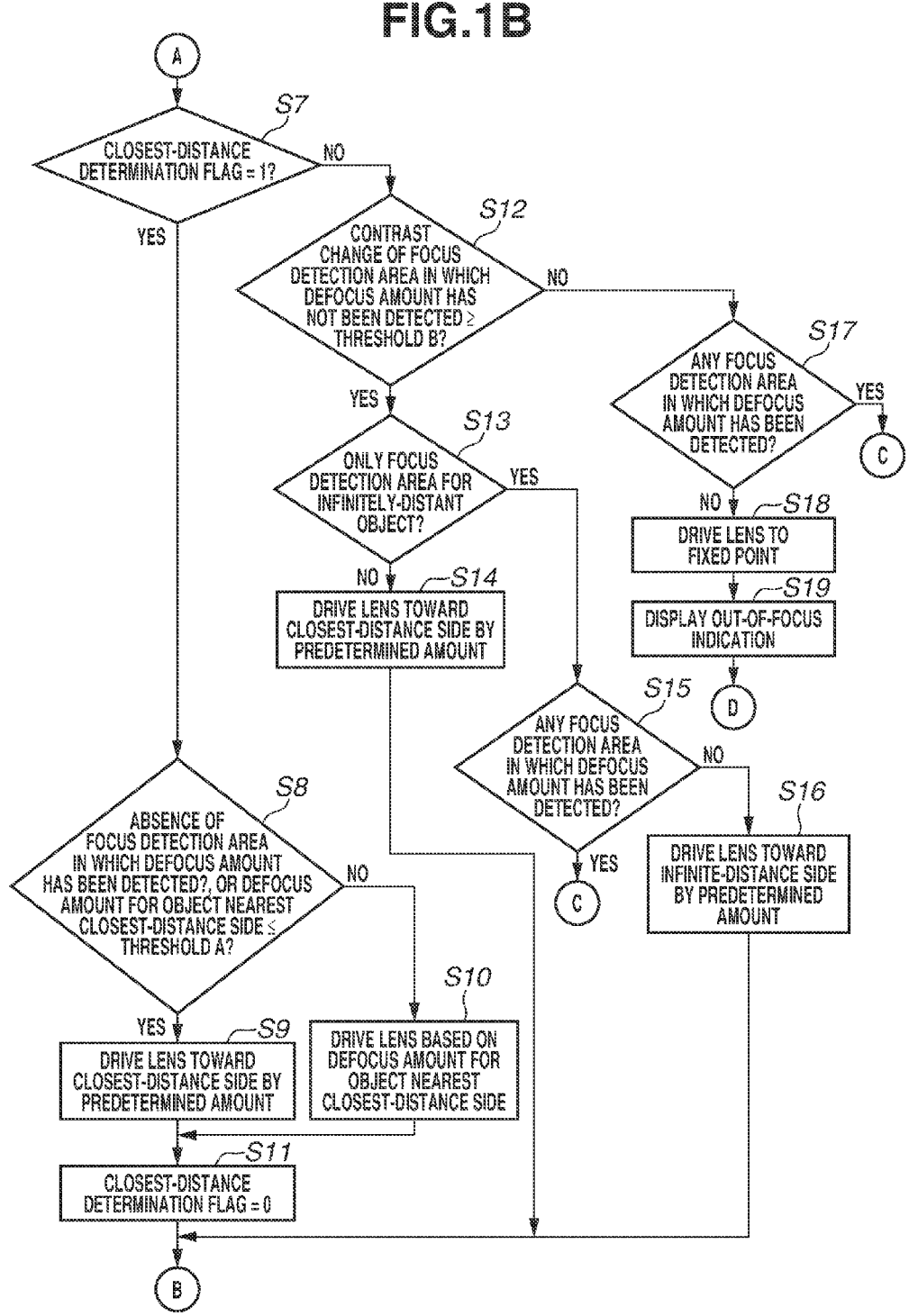

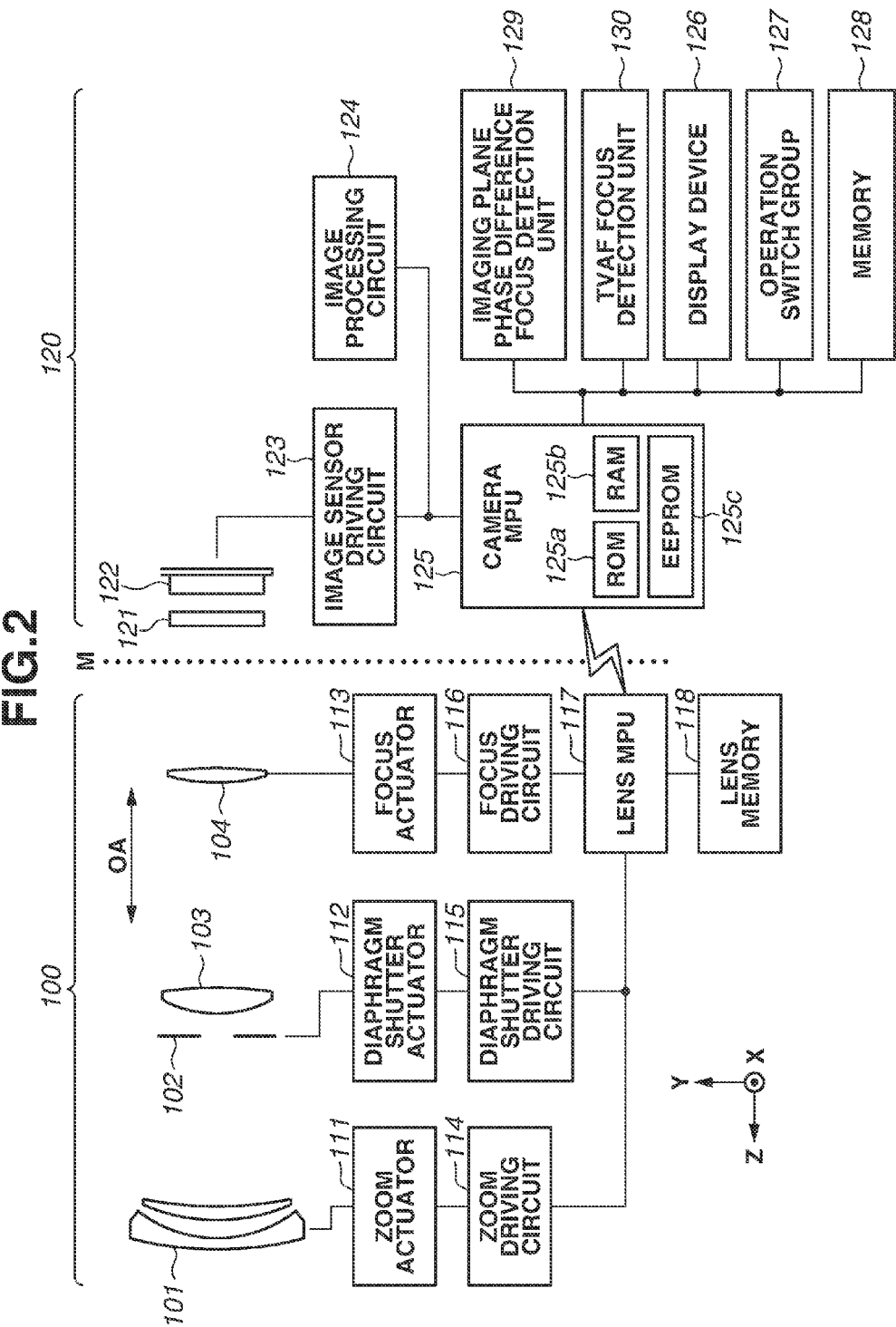

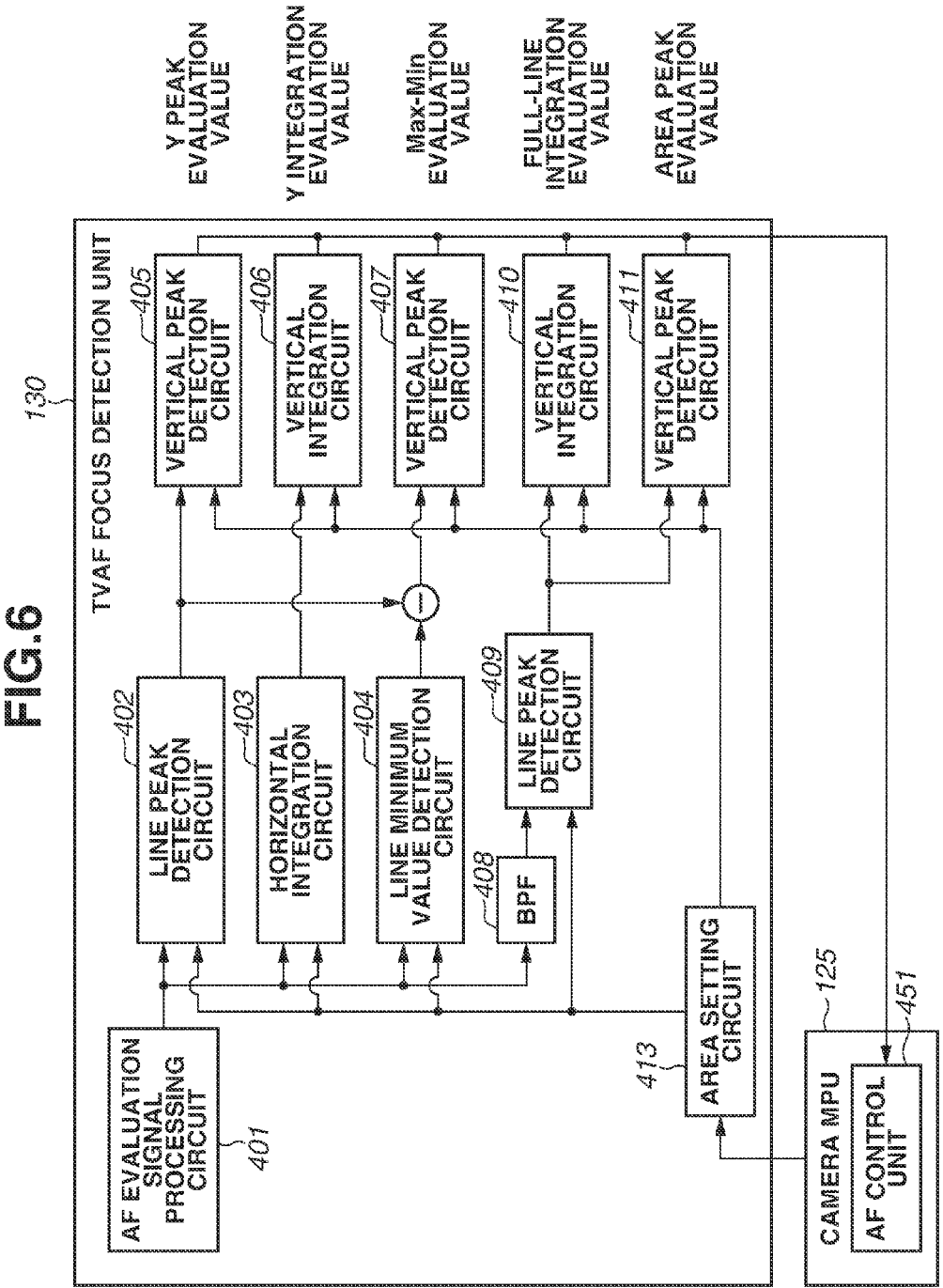

FIG.9

| FOCUS POSITION | ZOOM POSITION | | | | | | | |
|---|---|---|---|---|---|---|---|---|
| | 1 | 2 | 3 | 4 | 5 | 6 | 7 | 8 |
| 1 | BP111 | BP112 | BP113 | BP114 | BP115 | BP116 | BP117 | BP118 |
| 2 | BP121 | BP122 | BP123 | BP124 | BP125 | BP126 | BP127 | BP128 |
| 3 | BP131 | BP132 | BP133 | BP134 | BP135 | BP136 | BP137 | BP138 |
| 4 | BP141 | BP142 | BP143 | BP144 | BP145 | BP146 | BP147 | BP148 |
| 5 | BP151 | BP152 | BP153 | BP154 | BP155 | BP156 | BP157 | BP158 |
| 6 | BP161 | BP162 | BP163 | BP164 | BP165 | BP166 | BP167 | BP168 |
| 7 | BP171 | BP172 | BP173 | BP174 | BP175 | BP176 | BP177 | BP178 |
| 8 | BP181 | BP182 | BP183 | BP184 | BP185 | BP186 | BP187 | BP188 |

FIG.12A

| FOCUS POSITION | ZOOM POSITION | | | | | | | |
|---|---|---|---|---|---|---|---|---|
| | 1 | 2 | 3 | 4 | 5 | 6 | 7 | 8 |
| 1 | BP211 | BP212 | BP213 | BP214 | BP215 | BP216 | BP217 | BP218 |
| 2 | BP221 | BP222 | BP223 | BP224 | BP225 | BP226 | BP227 | BP228 |
| 3 | BP231 | BP232 | BP233 | BP234 | BP235 | BP236 | BP237 | BP238 |
| 4 | BP241 | BP242 | BP243 | BP244 | BP245 | BP246 | BP247 | BP248 |
| 5 | BP251 | BP252 | BP253 | BP254 | BP255 | BP256 | BP257 | BP258 |
| 6 | BP261 | BP262 | BP263 | BP264 | BP265 | BP266 | BP267 | BP268 |
| 7 | BP271 | BP272 | BP273 | BP274 | BP275 | BP276 | BP277 | BP278 |
| 8 | BP281 | BP282 | BP283 | BP284 | BP285 | BP286 | BP287 | BP288 |

FIG.12B

| FOCUS POSITION | ZOOM POSITION | | | | | | | |
|---|---|---|---|---|---|---|---|---|
| | 1 | 2 | 3 | 4 | 5 | 6 | 7 | 8 |
| 1 | BP311 | BP312 | BP313 | BP314 | BP315 | BP316 | BP317 | BP318 |
| 2 | BP321 | BP322 | BP323 | BP324 | BP325 | BP326 | BP327 | BP328 |
| 3 | BP331 | BP332 | BP333 | BP334 | BP335 | BP336 | BP337 | BP338 |
| 4 | BP341 | BP342 | BP343 | BP344 | BP345 | BP346 | BP347 | BP348 |
| 5 | BP351 | BP352 | BP353 | BP354 | BP355 | BP356 | BP357 | BP358 |
| 6 | BP361 | BP362 | BP363 | BP364 | BP365 | BP366 | BP367 | BP368 |
| 7 | BP371 | BP372 | BP373 | BP374 | BP375 | BP376 | BP377 | BP378 |
| 8 | BP381 | BP382 | BP383 | BP384 | BP385 | BP386 | BP387 | BP388 |

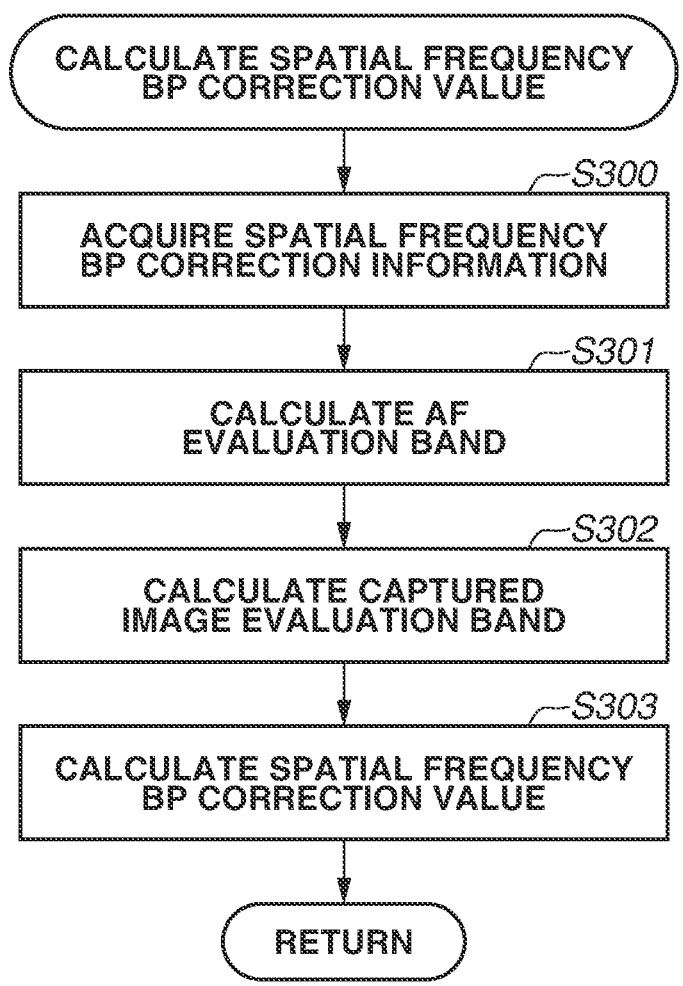

OBJECT

SIGNAL GENERATION

PHOTOGRAPHIC OPTICAL SYSTEM

SENSITIVITY DURING VIEWING AND DIGITAL FILTER

OPTICAL LPF

EVALUATION BAND

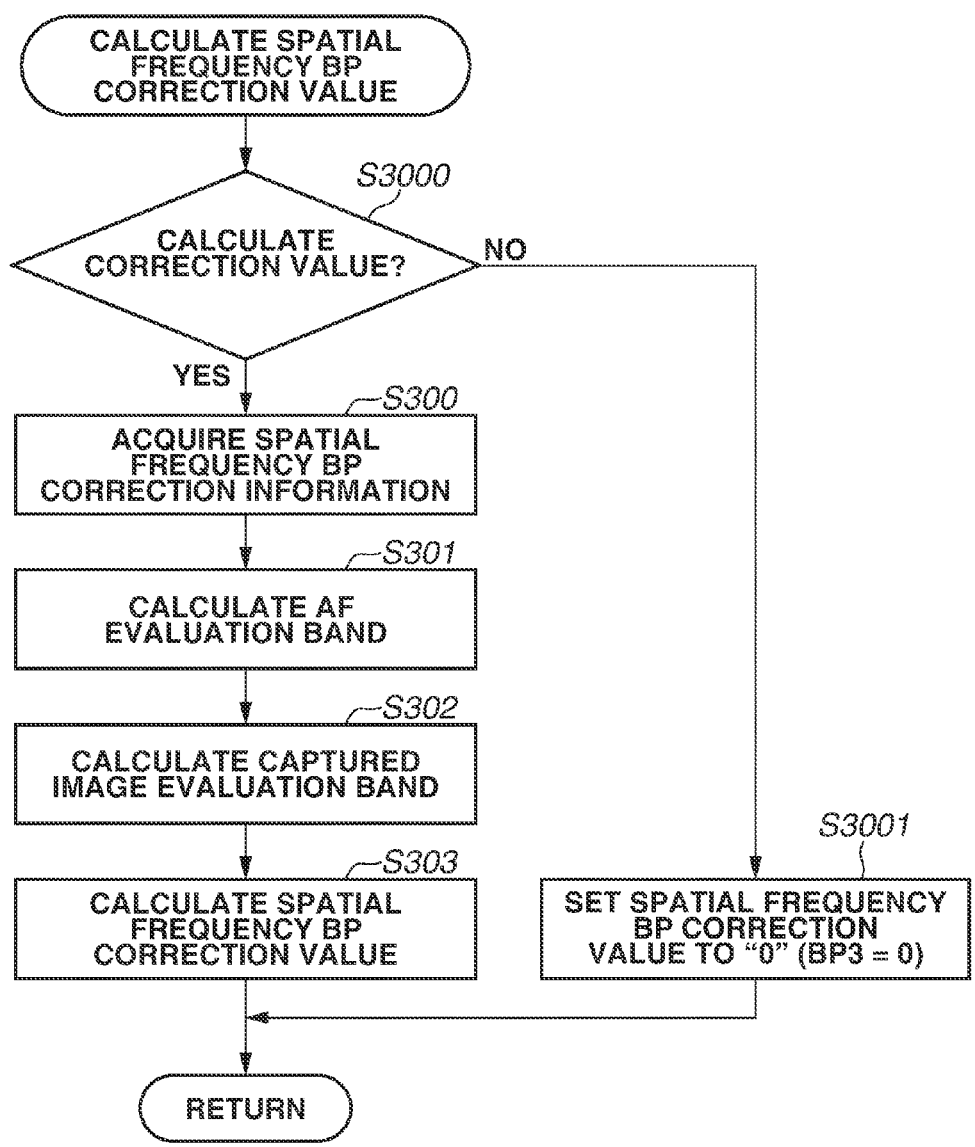

FOCUSING ADJUSTMENT APPARATUS AND FOCUSING ADJUSTMENT METHOD

CROSS REFERENCE TO RELATED APPLICATIONS

The present application is a continuation of U.S. patent application Ser. No. 14/603,214, filed on Jan. 22, 2015, which claims priority from Japanese Patent Application No. 2014-010702 filed Jan. 23, 2014, all of which are hereby incorporated by reference herein in their entirety.

BACKGROUND OF THE INVENTION

Field of the Invention

The present invention relates to an imaging apparatus and an imaging method, and more particularly to an imaging apparatus having an automatic focusing function.

Description of the Related Art

General focusing methods for imaging apparatuses include a contrast autofocus (AF) method and a phase difference AF method. Both the contrast AF method and the phase difference AF method are AF methods that are widely used for video cameras and digital still cameras, in some of which an image sensor is used as a focus detection sensor.

In such focusing methods, the focus detection result may have an error due to various aberrations of an optical system. Therefore, various methods for reducing the error have been proposed.

For example, Japanese Patent No. 5087077 discusses a method for calculating a correction value used to correct a focus detection result based on an evaluation frequency (evaluation band) of a signal used for focus detection.

Such a focus detection error occurs depending on the evaluation band of a focusing signal used in the contrast AF method or the phase difference AF method regardless of the types of focusing methods.

However, the above-mentioned conventional proposals have such an issue that it is not possible to sufficiently correct a focus detection error. The method discussed in Japanese Patent No. 5087077 includes specifying, as a focus detection error, a frequency band (evaluation band) for evaluating a focusing signal, and correcting the focus detection result using a correction value adapted for the evaluation band.

On the other hand, the focus detection error is a difference between a focusing state that is sensed by the observer to be a best in-focus state as an original captured image and a focusing state that is indicated by the focus detection result. However, Japanese Patent No. 5087077 has no mention of the focusing state of a captured image.

SUMMARY OF THE INVENTION

The present invention is directed to a focusing adjustment apparatus capable of performing more high-precision focusing by correcting a difference in focusing state between a captured image and a focus detection result, which is an essential focus detection error.

According to an aspect of the present invention, a focusing adjustment apparatus includes a focusing unit configured to output a first signal for a focusing operation, a first acquisition unit configured to acquire first information, which is related to characteristics of a signal used for outputting the first signal, and second information, which is related to characteristics of a captured image and is predetermined, a second acquisition unit configured to acquire third information on aberrations of an imaging optical system, and a control unit configured to calculate a correction value based on the first information, the second information, and the third information, wherein, by using the correction value, the control unit changes the first signal, output from the focusing unit, to a second signal used in the focusing operation.

Further features of the present invention will become apparent from the following description of exemplary embodiments with reference to the attached drawings.

BRIEF DESCRIPTION OF THE DRAWINGS

FIGS. 1A and 1B are flowcharts illustrating an autofocus (AF) operation procedure according to a first exemplary embodiment of the present invention.

FIG. 2 is a block diagram illustrating a schematic configuration of a digital camera according to the first exemplary embodiment.

FIG. 6 is a block diagram illustrating a circuit that calculates various AF evaluation values according to the first exemplary embodiment.

FIG. 9 illustrates an example of vertical-horizontal BP correction information according to the first exemplary embodiment.

FIGS. 12A and 12B illustrate an example of color BP correction information according to the first exemplary embodiment.

FIG. 13 is a flowchart illustrating a subroutine of the flow for calculating a spatial frequency BP correction value (BP3) according to the first exemplary embodiment.

FIG. 18 is a flowchart illustrating a subroutine of the flow for calculating a spatial frequency BP correction value (BP3) according to a third exemplary embodiment of the present invention.

DESCRIPTION OF THE EMBODIMENTS

Figure 3:
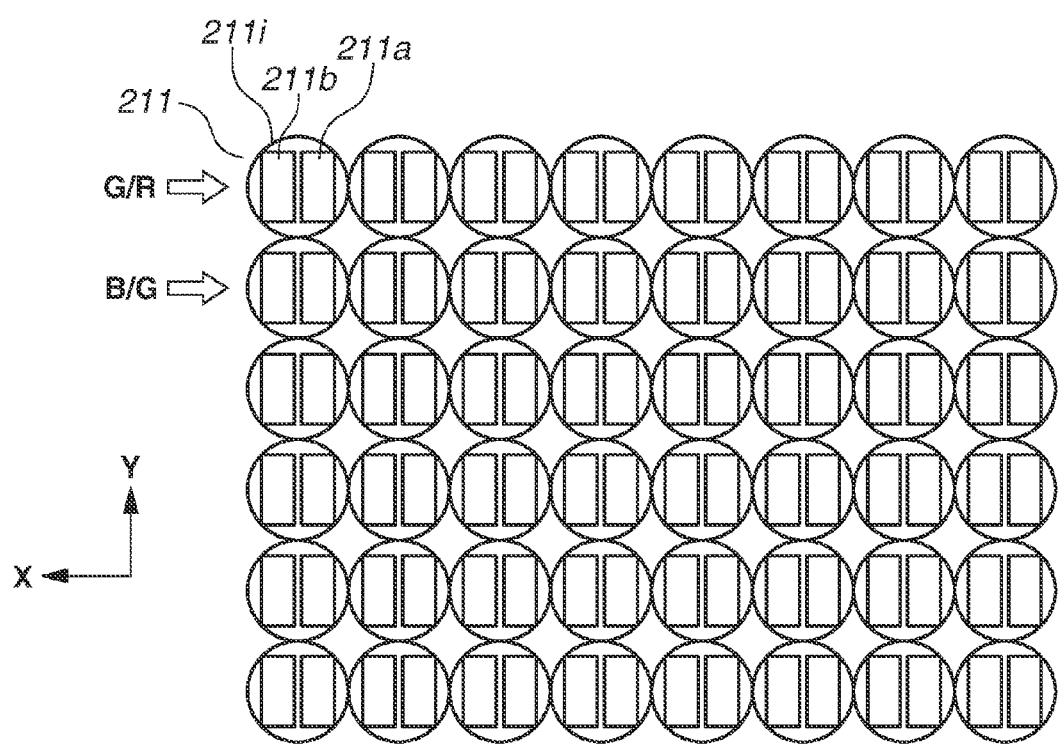
FIG. 3 is a plan view of the array of light-receiving pixels as viewed from a lens unit.

Various exemplary embodiments, features, and aspects of the invention will be described in detail below with reference to the drawings.

The following described an example in which an imaging apparatus according to a first exemplary embodiment of the present invention is applied to a lens-interchangeable, single-lens reflex type digital camera.

<Description of Configuration of Imaging Apparatus>

FIG. 2 is a block diagram of the digital camera according to the present exemplary embodiment. The digital camera according to the present exemplary embodiment, which is a lens-interchangeable single-lens reflex camera, includes a lens unit 100 and a camera body 120. The lens unit 100 can be connected to the camera body 120 via a mount M, which is indicated by the dotted line in FIG. 2.

The lens unit 100 includes a first lens group 101, a diaphragm shutter 102, a second lens group 103, a focus lens group (hereinafter simply referred to as a "focus lens") 104, and a drive/control system. In this way, the lens unit 100 includes the focus lens 104 as well as a photographic lens that forms an image of an object.

The first lens group 101 is located in the fore end of the lens unit 100 and is held to be movable forward and backward along an optical axis direction OA. The diaphragm shutter 102 is configured to adjust the amount of light at the time of shooting with its aperture diameter adjusted, and functions as a shutter for adjusting an exposure time at the time of still image shooting. The diaphragm shutter 102 and the second lens group 103 integrally move forward and backward along the optical axis direction OA and implement a zoom function in conjunction with the forward and backward movement of the first lens group 101. The focus lens 104 is configured to perform focusing by moving forward and backward along the optical axis direction OA.

The drive/control system includes a zoom actuator 111, a diaphragm shutter actuator 112, a focus actuator 113, a zoom driving circuit 114, and a diaphragm shutter driving circuit 115.

The drive/control system further includes a focus driving circuit 116, a lens micro processing unit (MPU) 117, a lens memory 118, a shift/tilt/rotation operation member (not illustrated), a displacement amount detection unit (not illustrated), and a displacement direction detection unit (not illustrated).

The zoom actuator 111 moves the first lens group 101 or the second lens group 103 forward and backward along the optical axis direction OA to perform a zoom operation. The diaphragm shutter actuator 112 controls the aperture diameter of the diaphragm shutter 102 to adjust the amount of shooting light and controls an exposure time at the time of still image shooting.

The focus actuator 113 moves the focus lens 104 forward and backward along the optical axis direction OA to perform focusing. The focus actuator 113 is equipped with a function serving as a position detection unit that detects the current position of the focus lens 104.

The zoom driving circuit 114 drives the zoom actuator 111 according to a zoom operation by the operator. The diaphragm shutter driving circuit 115 drives and controls the diaphragm shutter actuator 112 to control the aperture of the diaphragm shutter 102.

The focus driving circuit 116 drives and controls the focus actuator 113 based on a focus detection result to move the focus lens 104 forward and backward along the optical axis direction OA so as to perform focusing.

The lens MPU 117 performs all calculation and control operations concerning the photographic lens, and controls the zoom driving circuit 114, the shutter driving circuit 115, the focus driving circuit 116, and the lens memory 118. Furthermore, the lens MPU 117 detects the current positions of the first lens group 101, the second lens group 103, and the focus lens 104, and notifies a camera MPU 125 of information on the detected positions in response to a request from the camera MPU 125.

In other words, in an imaging apparatus in which a lens unit including an imaging optical system is attachable to and detachable from an imaging unit including an image sensor, the lens unit notifies the imaging unit of information about an image-forming position for every spatial frequency band of an object image formed by the imaging optical system and entering the image sensor.

Such lens position information includes the position on the optical axis of the focus lens 104, the position on the optical axis and the diameter of an exit pupil with the imaging optical system still not moved, and the position on the optical axis and the diameter of a lens frame that limits a light flux from the exit pupil. The lens memory 118 stores optical information required for automatic focusing.

The camera body 120 includes an optical low-pass filter 121, an image sensor 122, and a drive/control system.

The optical low-pass filter 121 and the image sensor 122 function as an imaging optical system that forms an object image with a light flux from the lens unit 100. The first lens group 101, the diaphragm shutter 102, the second lens group 103, the focus lens 104, and the optical low-pass filter 121 constitute the imaging optical system.

The optical low-pass filter 121 reduces false color or moire in a captured image.

The image sensor 122 is composed of a complementary metal-oxide semiconductor (CMOS) sensor and its peripheral circuits, and is equipped with m pixels in the horizontal direction by n pixels in the vertical direction. The image sensor 122 includes a part of a focus detection device, and is able to perform phase difference detection AF. An image processing circuit 124 converts image data associated with focus detection among captured image data into focus detection image data as a focus detection signal.

On the other hand, the image processing circuit 124 also receives image data used for display, recording, or television signal autofocus (TVAF) among the captured image data and performs predetermined processing associated with purposes on the received image data.

The drive/control system includes an image sensor driving circuit 123, the image processing circuit 124, a camera MPU 125, a display device 126, an operation switch group 127, a memory 128, an imaging plane phase difference focus detection unit 129, and a TVAF focus detection unit 130.

The image sensor driving circuit 123 controls an operation of the image sensor 122, performs analog-to-digital (A/D) conversion on the captured image signal, and transmits the converted digital signal to the camera MPU 125. The image processing circuit 124 performs gamma conversion, color interpolation, and Joint Photographic Experts Group (JPEG) compression on the image data captured by the image sensor 122.

The camera MPU 125 performs all calculation and control operations concerning the camera body 120, and controls the image sensor driving circuit 123, the image processing circuit 124, the display device 126, the operation switch group 127, the memory 128, the imaging plane phase difference focus detection unit 129, and the TVAF focus detection unit 130.

The camera MPU 125, which is connected to the lens MPU 117 via signal lines of the mount M, issues to the lens MPU 117 a request for acquiring lens positions or a request for driving lenses by predetermined driving amounts, or acquires optical information inherent in the lens unit 100.

The camera CPU 125 contains a read-only memory (ROM) 125a, which stores a program for controlling camera operations, a random access memory (RAM) 125b, which stores variables, and an electrically erasable programmable read-only memory (EEPROM) 125c, which stores various parameters.

Furthermore, the camera CPU 125 performs focus detection processing according to the program stored in the ROM 125a. The focus detection processing includes known correlation calculation processing using a pair of image signals obtained by photoelectrically converting optical images formed with light fluxes that have passed through different areas of the pupil. Furthermore, since the imaging plane phase difference detection AF is greatly affected by vignetting and thus decreases in reliability when the image height in the focus detection position is large, the camera MPU 125 also corrects for the decrease in reliability.

The display device 126, which is composed of a liquid crystal display or the like, displays information about camera shooting modes, a preview image obtained before shooting, a confirmation image obtained after shooting, and an in-focus state display image obtained at the time of focus detection. The operation switch group 127 includes a power switch, a release (shooting trigger) switch, a zoom operation switch, and a shooting mode selection switch. The memory 128, which serves as a recording unit according to the present exemplary embodiment, is a removable flash memory capable of recording captured images.

The imaging plane phase difference focus detection unit 129 performs focus detection processing with the phase difference detection type AF using image signals of focus detection image data obtained by the image sensor 122 and the image processing circuit 124. More specifically, the imaging plane phase difference focus detection unit 129 performs imaging plane phase difference AF based on the amount of deviation between a pair of images formed on focus detection pixels with light fluxes that have passed through a pair of pupil areas of the imaging optical system. The method for the imaging plane phase difference AF is described below in detail.

The TVAF focus detection unit 130 calculates various TVAF evaluation values from contrast components of image information obtained by the image processing circuit 124, and performs contrast type focus detection processing based on the calculated TVAF evaluation values. The contrast type focus detection processing includes moving the focus lens 104 to detect a focus lens position (the position of the focus lens 104) in which the focus evaluation value reaches a peak.

In this way, the present exemplary embodiment combines the imaging plane phase difference AF and the TVAF and can selectively use them or select them in combination depending on the situation. The imaging plane phase difference AF and the TVAF function as a control unit that controls the position of the focus lens 104 using the respective focus detection results.

<Description of Focus Detection Type Device>

The configuration of the camera system composed of the lens unit 100 and the camera body 120 has been described above. Next, the details of a focus detection device using signals from the image sensor 122 are described. The focus detection device employs the phase difference detection type AF and the contrast type AF. The following describes the configuration of the focus detection device.

<Description of Phase Difference Detection AF>

First, the configuration of the phase difference detection type AF is described with reference to FIG. 3 to FIGS. 5A and 5B.

FIG. 3 illustrates the array of pixels 211 of an image sensor according to the present exemplary embodiment, and more particularly illustrates the range of six rows in the vertical direction (Y direction) by eight columns in the horizontal direction (X direction) of a two-dimensional CMOS area sensor as viewed from the imaging optical system. A Bayer array is used for color filters, in which a green color filter (G) and a red color filter (R) are alternately arranged in order from the left on pixels of the odd-numbered rows, and a blue color filter (B) and a green color filter (G) are alternately arranged in order from the left on pixels of the even-numbered rows. A circle 211i represents an on-chip microlens. A plurality of rectangles arranged inside the on-chip microlens 211i represents two photoelectric conversion portions 211a and 211b.

In the present exemplary embodiment, a photoelectric conversion section of every pixel is divided into two regions in the X direction, and a photoelectric conversion signal obtained from one of the divided regions and the sum of photoelectric conversion signals obtained from the two divided regions can be independently read out. Then, with respect to the independently read-out signals, a signal corresponding to a photoelectric conversion signal obtained from the other of the divided regions can be obtained by calculating a difference between the sum of two photoelectric conversion signals and the photoelectric conversion signal obtained from one of the divided regions.

The photoelectric conversion signals obtained from the respective divided regions are used for phase difference type focus detection in a method described below, and can be used to generate a three-dimensional (3D) image composed of a plurality of images having parallax information. On the other hand, the sum of two photoelectric conversion signals is used as an ordinary captured image.

Here, pixel signals used when phase difference type focus detection is performed are described. As described below, in the present exemplary embodiment, the microlens 211i and the photoelectric conversion portions 211a and 211b corresponding to the divided regions are used to perform pupil division of a light flux exiting from the imaging optical system.

Then, in a plurality of pixels 211 within a predetermined range located on the same row, an image obtained by joining and arranging outputs of the photoelectric conversion portions 211a is set as an A image for AF, and, similarly, an image obtained by joining and arranging outputs of the photoelectric conversion portions 211b is set as a B image for AF. The outputs of the photoelectric conversion portions 211a and 211b are signals obtained by adding green, red, blue, and green outputs of the Bayer array and are calculated as pseudo luminance (Y) signals.

However, the A image for AF and the B image for AF may be formed for every color of red, blue, or green. Detecting a relative image deviation amount between the A image for AF and the B image for AF formed in the above-described way using correlation calculation enables detecting the focus deviation amount, i.e., the defocus amount, in a predetermined area.

In the present exemplary embodiment, although any one of the A image for AF and the B image for AF is not output from the image sensor, the sum of the A image output and the B image output is output from the image sensor. Therefore, the other signal can be obtained from a difference between the sum of A and B image outputs and one image output, so that it is possible to perform focus detection.

Since the above-described image sensor can be manufactured using the technique discussed in Japanese Patent Application Laid-Open No. 2004-134867, the details of the structure thereof are omitted from description.

<Configuration of Readout Circuit>

Figure 4:
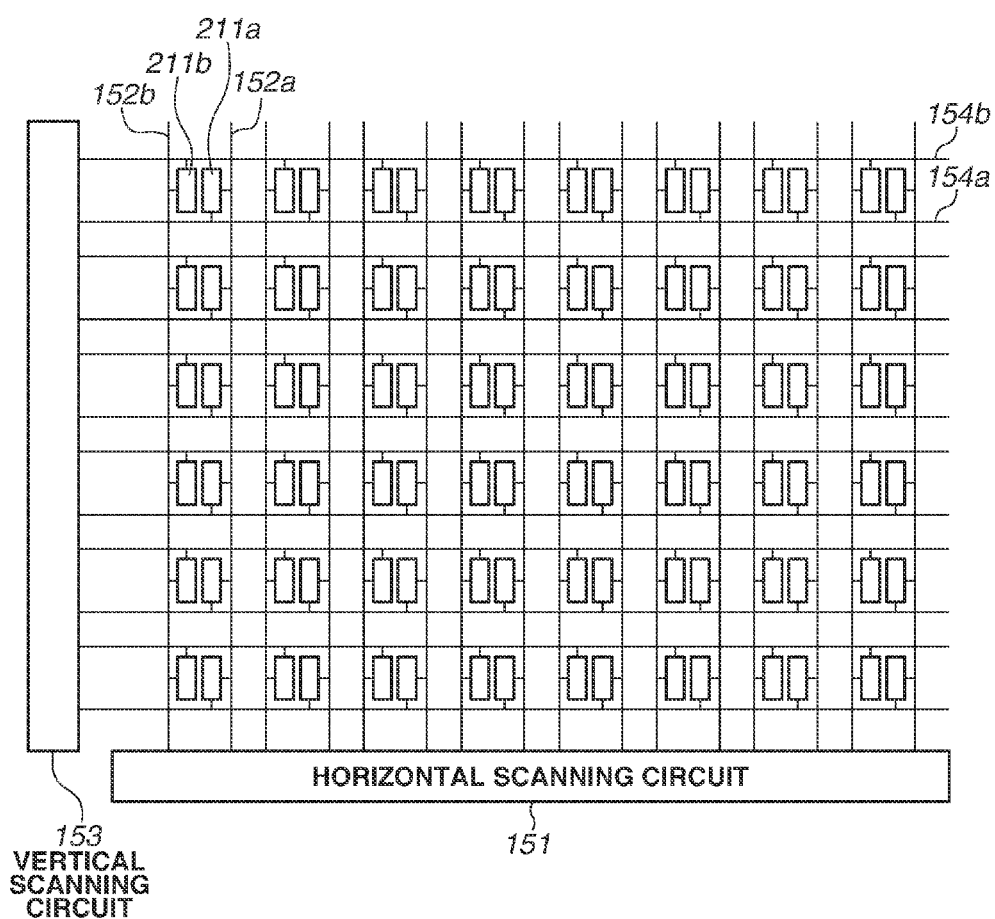
FIG. 4 illustrates a configuration of a readout circuit in an image sensor.

FIG. 4 illustrates a configuration of the readout circuit in the image sensor according to the present exemplary embodiment. The readout circuit includes a horizontal scanning circuit 151, a vertical scanning circuit 153, horizontal scanning lines 152a and 152b, and vertical scanning lines 154a and 154b. The horizontal scanning lines 152a and 152b and the vertical scanning lines 154a and 154b are arranged at the boundary portions between every pixel. Outputs from the photoelectric conversion portions 211a and 211b are read out to the outside via the horizontal scanning lines 152a and 152b and the vertical scanning lines 154a and 154b.

The image sensor according to the present exemplary embodiment has the following two types of readout modes. The first readout mode, which is called "full-pixel readout mode", is used to capture a high-definition still image. In the case of the full-pixel readout mode, signals from all of the pixels are read out.

The second readout mode, which is called "thinning-out readout mode", is used to record a moving image or to display only a preview image. In the case of the thinning-out readout mode, the required number of pixels is less than the total number of pixels. Therefore, signals from only pixels obtained by thinning out the pixels at a predetermined ratio in both the X direction and the Y direction are read out. Furthermore, even when high-speed readout is required, the thinning-out readout mode is also used. In thinning out the pixels in the X direction, processing for adding signals is performed to improve a signal-to-noise (S/N) ratio. In thinning out the pixels in the Y direction, signals output from the omitted rows are ignored. Focus detection of both the phase difference detection type and the contrast detection type is generally performed in the second readout mode.

<Description of Conjugate Relation>

Figure 5A:
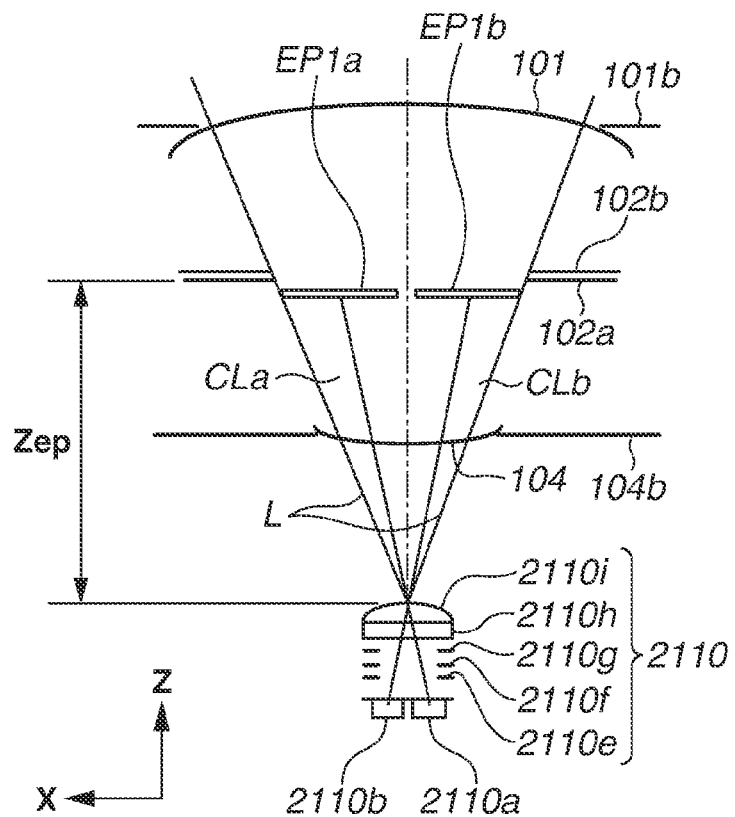
FIGS. 5A and 5B are a plan view and a sectional view, respectively, illustrating the structure of focus detection pixels in which the pupil is divided in the horizontal direction of a photographic lens.
Figure 5B:
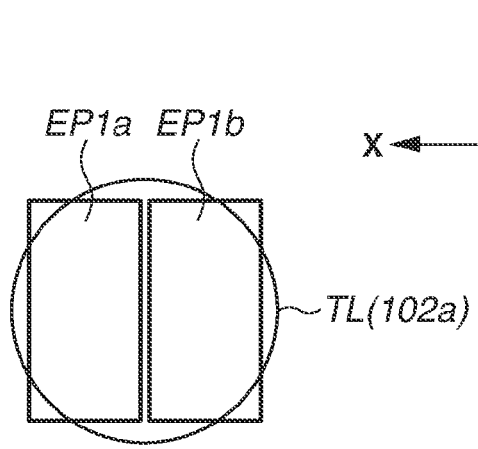

FIGS. 5A and 5B illustrate the conjugate relation between the exit pupil plane of the imaging optical system and the photoelectric conversion portions of the image sensor located in the vicinity of a place where the image height is zero, i.e., the center of an image plane, in the imaging apparatus according to the present exemplary embodiment. The photoelectric conversion portions in the image sensor and the exit pupil plane of the imaging optical system are designed to be conjugate with each other via an on-chip microlens. Then, generally, the exit pupil of the imaging optical system almost coincides with the plane where an iris diaphragm for light amount adjustment is located.

On the other hand, while the imaging optical system according to the present exemplary embodiment is a zoom lens having a variable magnification function, a magnification varying operation may vary the distance or size of the exit pupil relative to the image plane depending on types of the optical system. In the imaging optical system illustrated in FIG. 5A, the focal length is set to the middle between the wide-angle end and the telephoto end, i.e., the middle focal length. Supposing that this state exhibits the standard exit pupil distance Zep, the shape of the on-chip microlens and the decentering parameters set according to the image height (X and Y coordinates) are optimally designed.

Referring to FIG. 5A, a lens barrel member 101b holds the first lens group 101. A lens barrel member 104b holds the focus lens 104. An aperture plate 102a defines the aperture diameter when the diaphragm shutter 102 is fully opened. Diaphragm blades 102b adjust the aperture diameter when the diaphragm shutter 102 is operated to stop down the imaging optical system.

The members 101b, 102a, 102b, and 104b, which act as members for limiting a light flux passing through the imaging optical system, indicate optical virtual images as observed from the image plane. Furthermore, a composite aperture in the vicinity of the diaphragm shutter 102 is defined as the exit pupil of the imaging optical system, and the distance from the image plane to the exit pupil is defined as the exit pupil distance Zep.

Also referring to FIG. 5A, a pixel 2110, which photoelectrically converts an object image, is located in the vicinity of the center of the image plane and is referred to as a "central pixel" in the present exemplary embodiment. The central pixel 2110 is composed of various members including photoelectric conversion portions 2110a and 2110b, wiring layers 2110e, 2110f, and 2110g, a color filter 2110h, and an on-chip microlens 2110i.

Then, the two photoelectric conversion portions 2110a and 2110b are projected by the on-chip microlens 2110i onto the exit pupil plane of the imaging optical system. In other words, the exit pupil of the imaging optical system is projected onto the surfaces of the photoelectric conversion portions 2110a and 2110b via the on-chip microlens 2110i.

FIG. 5B illustrates projected images EP1a and EP1b of the photoelectric conversion portions 2110a and 2110b on the exit pupil plane of the imaging optical system. In the present exemplary embodiment, the image sensor includes pixels each of which is able to obtain both an output of any one of the two photoelectric conversion portions 2110a and 2110b and the sum of outputs of the two photoelectric conversion portions 2110a and 2110b.

The sum of outputs of the two photoelectric conversion portions 2110a and 2110b corresponds to outputs obtained by photoelectrically converting light fluxes that have passed through both areas of the projected images EP1a and EP1b, which are the entire pupil region of the imaging optical system.

In FIG. 5A, when an outermost portion of a light flux passing through the imaging optical system is denoted by L, the light flux L is limited by the aperture plate 102a of the diaphragm shutter 102, and the projected images EP1a and EP1b almost have no vignetting occurring in the imaging optical system. In FIG. 5B, the light flux L illustrated in FIG. 5A is denoted by TL.

As most of the projected images EP1a and EP1b of the photoelectric conversion portions 2110a and 2110b is included within a circle indicated by TL, it is understood that vignetting almost does not occur. Since the light flux L is limited only by the aperture plate 102a of the diaphragm shutter 102, "TL" can be reworded as "102a". In this case, the vignetting states of the projected images EP1a and EP1b in the center of the image plane become symmetrical with respect to the optical axis, and the amounts of light received by the photoelectric conversion portions 2110a and 2110b are equal.

As described above with reference to FIGS. 3, 4, 5A, and 5B, the image sensor 122 has not only an image capturing function but also a function serving as a focus detection device. Furthermore, since the image sensor 122 includes focus detection pixels that receive light fluxes obtained by dividing the exit pupil, the phase difference detection type AF can be performed as a focus detection method.

Although the above description is directed to a configuration that divides the exit pupil in the horizontal direction, pixels that divide the exit pupil in the vertical direction may be additionally mounted on the image sensor. mounting the pixels that divide the exit pupil in the horizontal direction and vertical direction enables performing focus detection capable of dealing with an object contrast not only in the horizontal direction but also in the vertical direction.

<Description of Contrast Type AF>

Next, the configuration of the contrast type AF is described with reference to FIG. 6. FIG. 6 illustrates the flow of calculation of various AF evaluation values, which are calculated using the camera MPU 125 and the TVAF focus detection unit 130 illustrated in FIG. 2.

When a digital signal output from the image sensor driving circuit 123 is input to the TVAF focus detection unit 130, an AF evaluation signal processing circuit 401 extracts a green (G) component from the Bayer array signals, and performs, on the green component, gamma correction processing for enhancing a low-luminance component and suppressing a high-luminance component.

Although the present exemplary embodiment is directed to a case where a green (G) signal is used to perform TVAF focus detection, all of the signals of red (R), blue (B), and green (G) may be used. Furthermore, all of the signals of R, G, and B may be used to generate a luminance (Y) signal. In the following description, an output signal generated by the AF evaluation signal processing circuit 401 is referred to as a "luminance signal Y" regardless of colors of the signal.

A method for calculating a Y peak evaluation value is described as follows. The gamma-corrected luminance signal Y is input to a line peak detection circuit 402 for detecting a line peak value for every horizontal line. The line peak detection circuit 402 obtains a Y line peak value for every horizontal line within an AF evaluation range set by an area setting circuit 413.

Then, the output of the line peak detection circuit 402 is input to a vertical peak detection circuit 405. The vertical peak detection circuit 405 performs peak holding in the vertical direction within the AF evaluation range set by the area setting circuit 413 and generates a Y peak evaluation value. The Y peak evaluation value is useful for determining a high-luminance object or a low-illuminance object.

A method for calculating a Y integration evaluation value is described as follows. The gamma-corrected luminance signal Y is input to a horizontal integration circuit 403 for detecting an integrated value for every horizontal line. The horizontal integration circuit 403 obtains a Y integrated value for every horizontal line within the AF evaluation range set by the area setting circuit 413. Then, the output of the horizontal integration circuit 403 is input to a vertical integration circuit 406.

The vertical integration circuit 406 performs integration in the vertical direction within the AF evaluation range set by the area setting circuit 413 and generates a Y integration evaluation value. The Y integration evaluation value is used to determine the brightness within the entire AF evaluation range.

A method for calculating a Max-Min evaluation value is described as follows. The gamma-corrected luminance signal Y is input to the line peak detection circuit 402, which obtains a Y line peak value for every horizontal line within the AF evaluation range. The gamma-corrected luminance signal Y is further input to a line minimum value detection circuit 404.

The line minimum value detection circuit 404 detects a Y minimum value for every horizontal line within the AF evaluation range of the luminance signal Y. The detected Y line peak value for every horizontal line and the detected Y minimum value are input to a subtractor to calculate "the line peak value–the minimum value", which is then input to a vertical peak detection circuit 407.

The vertical peak detection circuit 407 performs peak holding in the vertical direction within the AF evaluation range and generates a Max-Min evaluation value. The Max-Min evaluation value is useful for determining a low contrast and a high contrast.

A method for calculating an area peak evaluation value is described as follows. The gamma-corrected luminance signal Y is input to a band-pass filter (BPF) 408, which extracts a specific frequency component and generates a focus signal. The focus signal is input to a line peak detection circuit 409, which is a peak holding unit that detects a line peak value for every horizontal line.

The line peak detection circuit 409 obtains a line peak value for every horizontal line within the AF evaluation range. The obtained peak value is input to a vertical peak detection circuit 411, which performs peak holding within the AF evaluation range to generate an area peak evaluation value.

The area peak evaluation value changes only a little even when an object moves within the AF evaluation range. Therefore, the area peak evaluation value is useful for determining restart for shifting to processing that finds an in-focus point again from the in-focus state.

A method for calculating a full-line integration evaluation value is described as follows. Similar to the area peak evaluation value, the line peak detection circuit 409 obtains a line peak value for every horizontal line within the AF evaluation range. Then, the obtained peak value is input to a vertical integration circuit 410, which performs integration for all of the horizontal scanning lines in the vertical direction within the AF evaluation range and generates a full-line integration evaluation value.

The high-frequency full-line integration evaluation value has a wide dynamic range and a high sensitivity owing to the effect of integration, and is, therefore, useful as a main evaluation value for AF to detect an in-focus position.

In the present exemplary embodiment, the full-line integration evaluation value, which changes according to the defocus state and is used for focusing, is referred to as a "focus evaluation value".

The area setting circuit 413 generates a gate signal for an AF evaluation range used to select signals from a predetermined position within a screen set by the camera MPU 125.

The gate signal is input to the line peak detection circuit 402, the horizontal integration circuit 403, the line minimum value detection circuit 404, the line peak detection circuit 409, the vertical integration circuits 406 and 410, and the vertical peak detection circuits 405, 407, and 411.

Then, timing at which the luminance signal Y is input to each circuit is controlled such that each focus evaluation value is generated from the luminance signal Y within the AF evaluation range.

Furthermore, the area setting circuit 413 is able to set a plurality of areas according to the AF evaluation range.

An AF control unit 451 included in the camera MPU 125 receives the various focus evaluation values and controls the focus actuator 113 via the focus driving circuit 116 to perform AF control by moving the focus lens 104 along the optical axis.

In the present exemplary embodiment, the TVAF focus detection unit 130 calculates the various focus evaluation values in the vertical line direction as well as in the horizontal line direction as described above. This enables performing focus detection with respect to contrast information of an object in both the horizontal and vertical directions.

In performing contrast type AF, the digital camera calculates the above-described various AF evaluation values while driving the focus lens 104. Then, the digital camera performs focus detection by detecting a position of the focus lens 104 at which the full-line integration evaluation value becomes maximum.

<Description of Focus Detection Area>

Figure 7:
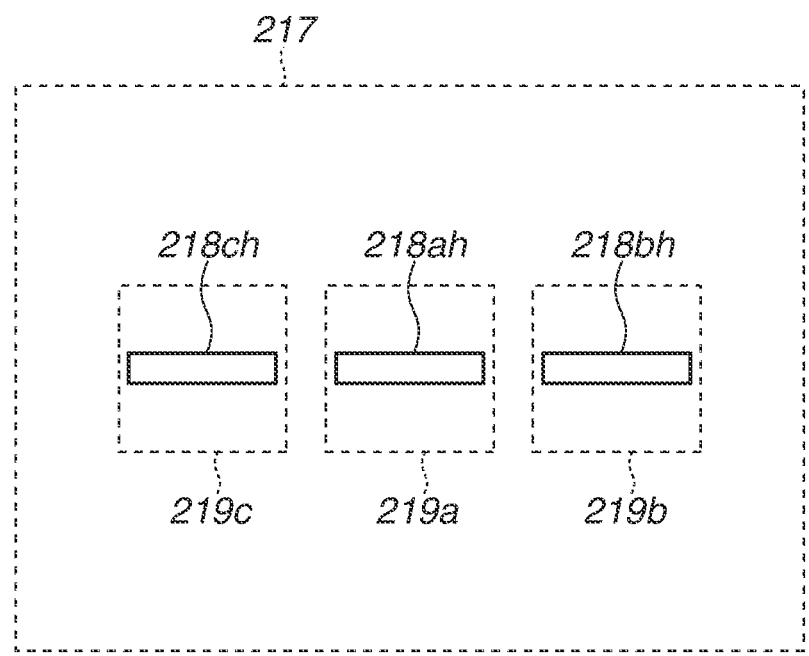
FIG. 7 illustrates focus detection areas within a shooting range and an example of the condition of an object.

FIG. 7 illustrates focus detection areas within a shooting range. In each of the focus detection areas, the imaging plane phase difference AF and the TVAF are performed based on signals obtained from the image sensor 122. Each focus detection area illustrated in FIG. 7 is equipped with focus detection portions including pixels that perform pupil division in the horizontal direction (lateral direction) of the imaging optical system illustrated in FIG. 3.

Furthermore, a rectangle indicated with the dotted line represents a shooting range 217 on which pixels of the image sensor 122 are formed. Within the shooting range 217, three focus detection areas 218ah, 218bh, and 218ch are formed in the horizontal direction to be used for the imaging plane phase difference AF. In the present exemplary embodiment, three focus detection areas of the phase difference detection type are arranged at the central portion and the left and right portions of the shooting range 217, as illustrated in FIG. 7.

Furthermore, three focus detection areas 219a, 219b, and 219c to be used for the TVAF are formed in the form of respectively containing the three focus detection areas 218ah, 218bh, and 218ch to be used for the imaging plane phase difference AF. In the focus detection areas 219a, 219b, and 219c to be used for the TVAF, contrast detection is performed using the focus evaluation values in the horizontal and vertical directions illustrated in FIG. 6.

In the example illustrated in FIG. 7, the focus detection areas are arranged mainly at three regions. However, the present invention is not limited to such three regions. A plurality of areas may be arranged at arbitrary positions.

<Description of Flow of Focus Detection Processing>

Next, focus detection (AF) processing in the digital camera having the above-described configuration according to the present exemplary embodiment is described with reference to FIGS. 1A and 1B. The outline of AF processing according to the present exemplary embodiment is described as follows. First, the digital camera obtains a focus deviation amount (defocus amount) and reliability in each of the focus detection areas 218ah, 218bh, and 218ch.

Then, the digital camera distinguishes between an area in which the defocus amount having a predetermined reliability has been obtained and an area in which that has not been obtained. If the defocus amount having a predetermined reliability has been obtained in all of the focus detection areas 218ah, 218bh, and 218ch, the digital camera drives the focus lens 104 to focus on a closest-distance object.

On the other hand, if there is any area in which the defocus amount having a predetermined reliability has not been obtained, the digital camera determines whether an object exists in a position nearer the closest-distance side using the amounts of change of the focus evaluation values between before and after driving of the focus lens 104 in a corresponding area among the focus detection areas 219a, 219b, and 219c.

Then, if it is determined that an object exists in a position nearer the closest-distance side, the digital camera drives the focus lens 104 based on changes of the focus evaluation values. However, in a case where the focus evaluation values are not obtained before this time, the digital camera cannot obtain the amounts of change of the focus evaluation values. In that case, if there is an area in which the defocus amount having a predetermined reliability, which is larger than a predetermined defocus amount, has been obtained, the digital camera drives the focus lens 104 to focus on a closest-distance object.

In the other cases, i.e., if there is no area in which the defocus amount having a predetermined reliability has been obtained, and if the obtained defocus amount is smaller than a predetermined defocus amount, the digital camera drives the focus lens 104 as much as a predetermined amount, which is unrelated to the defocus amount.

The reason why, if the defocus amount is small, the digital camera drives the focus lens 104 as much as a predetermined amount, which is unrelated to the defocus amount, is that there is a high possibility that the lens driving amount calculated based on the obtained defocus amount may make it difficult to detect changes of the focus evaluation values at the time of next focus detection.

After completion of the focus detection performed in any of the above-described methods, the digital camera calculates various correction values to correct a focus detection result. The digital camera drives the focus lens 104 based on the corrected focus detection result and then terminates focusing processing.

In the following, the above-described AF processing is described in detail. FIGS. 1A and 1B are flowcharts illustrating the AF operation procedure of the imaging apparatus. A control program associated with the AF operation is executed by the camera MPU 125. When starting the AF operation, in step S1, the camera MPU 125 sets focus detection areas to be used for focusing on an object. In the processing in step S1, the focus detection areas are set at three places as illustrated in FIG. 7.

Then, in step S2, the camera MPU 125 sets a closest-distance determination flag to "1". In step S3, the camera MPU 125 acquires signals required for focus detection in the respective focus detection areas. More specifically, after performing exposure on the image sensor 122, the camera MPU 125 acquires image signals of focus detection pixels in the respective focus detection areas 218ah, 218bh, and 218ch for the imaging plane phase difference AF.

Here, the camera MPU 125 can perform, on the acquired image signals, correction processing discussed in Japanese Patent Application Laid-Open No. 2010-117679. Furthermore, after performing exposure on the image sensor 122, the camera MPU 125 acquires pixel signals in the respective focus detection areas 219a, 219b, and 219c to be used for the TVAF, and calculates focus evaluation values. The camera MPU 125 stores the calculated focus evaluation values into the RAM 125b.

Then, in step S4, the camera MPU 125 determines whether a peak (maximum value) of each focus evaluation value has been detected. This step is used to perform focus detection of the contrast detection type. If a reliable peak has been detected (YES in step S4), the processing proceeds to step S20 to terminate focus detection. The reliability of a focus evaluation value can be determined using, for example, a method discussed in Japanese Patent Application Laid-Open no. 2010-078810 (FIGS. 10 to 13 thereof).

More specifically, the camera MPU 125 determines whether the focus evaluation value indicative of an in-focus state is in a hill-like shape based on a difference between a maximum value and a minimum value of the focus evaluation value, the length of a portion sloping at a slope equal to or greater than a predetermined value (SlopeThr), and the slope of the sloping portion. This enables determining the reliability of the peak.

In the present exemplary embodiment, since both the contrast detection type AF and the phase difference detection type AF are used in combination, in a case where it is determined that an object nearer the closest-distance side exists in the same focus detection area or another focusing detection area, the processing may proceed to step S5 without termination of focus detection even if a reliable peak of the focus evaluation value has been detected.

In that case, the camera MPU 125 stores the position of the focus lens 104 corresponding to the focus evaluation value peak, and, after that, if a reliable focus detection result has not been obtained, the camera MPU 125 sets the stored position of the focus lens 104 as a focus detection result.

Then, in step S5, the camera MPU 125 calculates the amount of deviation between a pair of image signals obtained in each focus detection area for the imaging plane phase difference AF, and calculates the defocus amount using previously-stored conversion factors, which are used for conversion to defocus amounts. Here, the camera MPU 125 also determines the reliability of the calculated defocus amount and uses, for subsequent AF processing, only a defocus amount in a focus detection area determined to have a predetermined reliability.

Due to the influence of vignetting in the imaging optical system, as the defocus amount becomes larger, the amount of deviation between a pair of detected image signals contains more error. Therefore, in a case where the calculated defocus amount is large, a case where the degree of coincidence in shape of a pair of image signals is low, and a case where the contrast of a pair of image signals is low, the camera MPU 125 determines that high-precision focus detection is impossible, in other words, determines that the reliability of the calculated defocus amount is low.

Hereinafter, a case where the calculated defocus amount has a predetermined reliability is referred to as a case where "the defocus amount has been calculated". A case where the defocus amount has not been calculated for some reason or a case where the reliability of the calculated defocus amount is low is referred to as a case where "the defocus amount has not been calculated".

Then, in step S6, the camera MPU 125 determines whether the defocus amount has been calculated in all of the focus detection areas 218ah, 218bh, and 218ch set in step S1. If the defocus amount has been calculated in all of the focus detection areas (YES in step S6), the processing proceeds to step S20. In step S20, the camera MPU 125 calculates a vertical-horizontal best focus (BP) correction value (BP1) with respect to a focus detection area in which the defocus amount indicative of an object located nearest the closest-distance side among the calculated defocus amounts has been calculated.

Here, the reason for selecting an object nearest the closest-distance side is that an object the photographer generally desires to focus on is often located on the closest-distance side. The vertical-horizontal BP correction value (BP1) is used to correct a difference between a focus detection result obtained when focus detection is performed with respect to an object contrast in the horizontal direction and a focus detection result obtained when focus detection is performed with respect to an object contrast in the vertical direction.

Generally, objects have contrasts in both the horizontal direction and the vertical direction. The evaluation of the focusing state of a captured image is performed in view of contrasts in both the horizontal direction and the vertical direction. On the other hand, in a case where focus detection is performed only in the horizontal direction as in the above-described phase difference detection type AF, an error occurs between a focus detection result obtained in the horizontal direction and a focusing state of the captured image obtained in both the horizontal direction and the vertical direction.

This error occurs due to astigmatism or the like of the imaging optical system. The vertical-horizontal BP correction value (BP1) is used to correct such an error. Furthermore, the vertical-horizontal BP correction value (BP1) is calculated in view of the selected focus detection area, the position of the focus lens 104, and the position of the first lens group 101 indicative of a zoom state. The details of a method for calculating the vertical-horizontal BP correction value (BP1) are described below.

Then, in step S21, the camera MPU 125 calculates a color BP correction value (BP2) with respect to the focus detection area targeted for the correction value calculation in step S20, using contrast information in any one of the vertical direction and the horizontal direction. The color BP correction value (BP2) is used to correct an error occurring due to chromatic aberration of the imaging optical system. This error occurs due to a difference between the color balance of signals used for focus detection and the color balance of signals used for a captured image or developed image. For example, in a case where focus detection of the contrast detection type is performed in the present exemplary embodiment, since the focus evaluation value used for such focus detection is generated from outputs of pixels having green (G) color filters, the camera MPU 125 mainly detects an in-focus position in green-color wavelengths.

On the other hand, since a captured image is generated using all of R, G, and B colors, in a case where the in-focus position in red (R) or blue (B) color is different from that in green (G) color, a deviation (error) occurs between the detected in-focus position and a focus detection result obtained from the focus evaluation value. The color BP correction value (BP2) is used to correct such an error. The details of a method for calculating the color BP correction value (BP2) are described below.

Then, in step S22, the camera MPU 125 calculates a color spatial frequency BP correction value (BP3) with respect to the focus detection area targeted for correction in steps S20 and S21, using contrast information of the green or luminance signal Y in any of the vertical direction and the horizontal direction. The spatial frequency BP correction value (BP3) is used to correct an error occurring due to spherical aberration of the imaging optical system. This error occurs due to a difference between the evaluation frequencies (band) of signals used for focus detection and the evaluation frequencies (band) of signals used for viewing a captured image.

During focus detection, as described above, since the mode for reading out output signals from the image sensor is the second readout mode, the output signals are added or thinned out. Therefore, the output signal used for focus detection becomes lower in evaluation band than the captured image generated from signals of all the pixels read out in the first readout mode. The difference in evaluation band causes an error that is to be corrected with the spatial frequency BP correction value (BP3). The details of a method for calculating the spatial frequency BP correction value (BP3) are described below.

Then, in step S23, the camera MPU 125 corrects a focus detection result DEF_B according to the following formula (1) using the three types of correction values (BP1, BP2, and BP3) calculated in the above steps, thus calculating a corrected defocus amount DEF_A.

$$DEF\_A = DEF\_B + BP1 + BP2 + BP3 \quad (1)$$

In the first exemplary embodiment, the camera MPU 125 calculates correction values for correcting the focus detection result at three stages of vertical-horizontal, color, and spatial frequency in this order.

The camera MPU 125 first calculates the vertical-horizontal BP correction value, thus calculating an error occurring due to the use of contrast information obtained in only one direction for focus detection, while contrast information obtained in both the vertical direction and the horizontal direction is used for the evaluation in viewing a captured image.

Secondly, the camera MPU 125 calculates the color BP correction value, thus calculating, as a correction value, an error in in-focus position by color used in signals for viewing a captured image and performing focus detection in contrast information in one direction, separately from the influence of vertical-horizontal BP.

Thirdly, the camera MPU 125 calculates the spatial frequency BP correction value, thus calculating, as a correction value, an error in in-focus position occurring due to a difference in evaluation band in signals for viewing a captured image and performing focus detection, with respect to a specific color, such as green or luminance signal, in contrast information in one direction.

In this way, the camera MPU 125 calculates the three types of errors independently and separately, thus aiming at reducing the amount of computation and the volume of data stored in a lens or a camera.

In step S24, the camera MPU 125 drives the focus lens 104 based on the corrected defocus amount DEF_A calculated according to formula (1) (focusing control).

Then, in step S25, the camera MPU 125 causes the display device 126 to display an in-focus indication with respect to the focus detection area in which the defocus amount used for driving the focus lens 104 has been calculated, and then ends the AF processing.

On the other hand, if there is any focus detection area in which the defocus amount has not been calculated (NO in step S6), the processing proceeds to step S7 illustrated in FIG. 1B.

In step S7, the camera MPU 125 determines whether the closest-distance determination flag is "1". The closest-distance determination flag becomes "1" when the focus lens 104 has never been driven since the AF operation started, and becomes "0" when the focus lens 104 has been driven a plurality of times since the AF operation started. If the closest-distance determination flag is "1" (YES in step S7), the processing proceeds to step S8.

In step S8, the camera MPU 125 determines whether the defocus amount has been calculated in none of the focus detection areas, or whether the defocus amount indicative of the presence of an object nearest the closest-distance side among the calculated defocus amounts is equal to or less than a predetermined threshold A. If so (YES in step S8), the processing proceeds to step S9. In step S9, the camera MPU 125 drives the focus lens 104 toward the closest-distance side by a predetermined amount.

Here, the reason why the camera MPU 125 drives the focus lens 104 toward the closest-distance side by a predetermined amount if the determination in step S8 is YES is as follows. First, a case where the defocus amount has been calculated in none of the focus detection areas means a case where no object to be focused on has been found at the current moment. Therefore, before determining that it is impossible to attain an in-focus state, the camera MPU 125 drives the focus lens 104 by a predetermined amount so as to check the presence of an object to be focused on with respect to all of the focus detection areas, thus enabling determining any change of the focus evaluation value as described below.

Furthermore, a case where the defocus amount indicative of the presence of an object nearest the closest-distance side among the calculated defocus amounts is equal to or less than a predetermined threshold A means a case where there is a focus detection area that is almost in an in-focus state at the current moment.

In such a situation, the camera MPU 125 drives the focus lens 104 by a predetermined amount so as to check the possibility of an object that has not been detected at the current moment being present nearer the closest-distance side with respect to the focus detection area in which the defocus amount has not been calculated, thus enabling determining any change of the focus evaluation value as described below.

The amount of driving of the focus lens 104 in step S9 can be determined in view of the F-number of the imaging optical system or the sensitivity of the focus movement amount on the image sensor surface relative to the lens driving amount.

On the other hand, if NO in step S8, i.e., if the defocus amount indicative of the presence of an object nearest the closest-distance side among the calculated defocus amounts is greater than the predetermined threshold A, the processing proceeds to step S10. This case means a case where, while there is a focus detection area in which the defocus amount has been calculated, the focus detection area is not in an in-focus state.

Therefore, in step S10, the camera MPU 125 drives the focus lens 104 based on the defocus amount indicative of the presence of an object nearest the closest-distance side among the calculated defocus amounts.

After driving of the focus lens 104 in step S9 or S10, the processing proceeds to step S11. In step S11, the camera MPU 125 sets the closest-distance determination flag to "0", and the processing then returns to step S3 illustrated in FIG. 1A.

If the closest-distance determination flag is not "1" (is "0") (NO in step S7), the processing proceeds to step S12. In step S12, the camera MPU 125 determines whether the focus evaluation value of a focus detection area for the TVAF corresponding to the focus detection area in which the defocus amount has not been calculated has changed by a predetermined threshold B or more between before and after driving of the focus lens 104. Here, while the focus evaluation value may increase or decrease, the camera MPU 125 determines whether the absolute value of the amount of change of the focus evaluation value is equal to or greater than the predetermined threshold B.

In step S12, a case where the absolute value of the amount of change of the focus evaluation value is equal to or greater than the predetermined threshold B means a case where, while the defocus amount has not been calculated, a change in blurred state of the object has been detected based on an increase or decrease of the focus evaluation value. Therefore, in the present exemplary embodiment, even when the camera MPU 125 cannot detect the defocus amount obtained by the imaging plane phase difference AF, the camera MPU 125 determines the presence or absence of an object based on an increase or decrease of the focus evaluation value, and continues the AF processing.

This enables performing focusing with respect to an object that cannot be detected by the imaging plane phase difference AF due to a large defocus amount Here, the predetermined threshold B used for the determination can be changed according to the amount of previously-performed driving of the focus lens 104 (the lens driving amount). As the lens driving amount is larger, a larger value is set as the threshold B. As the lens driving amount is smaller, a smaller value is set as the threshold B.

This is because, when an object is present, the amount of change of the focus evaluation value also increases according to an increase of the lens driving amount. The values of the threshold B for the respective lens driving amounts are stored in the EEPROM 125c.

If the absolute value of the amount of change of the focus evaluation value is equal to or greater than the predetermined threshold B (YES in step S12), the processing proceeds to step S13. In step S13, the camera MPU 125 determines whether the focus detection area in which the amount of change of the focus evaluation value is equal to or greater than the threshold B is only a focus detection area indicative of the presence of an infinitely-distant object.

A case where the focus detection area is indicative of the presence of an infinitely-distant object means a case where the focus evaluation value decreases when the focus lens 104 is driven toward the closest-distance side, or a case where the focus evaluation value increases when the focus lens 104 is driven toward the infinite-distance side.

If the focus detection area in which the amount of change of the focus evaluation value is equal to or greater than the threshold B is not only a focus detection area indicative of the presence of an infinitely-distant object (NO in step S13), the processing proceeds to step S14. In step S14, the camera MPU 125 drives the focus lens 104 toward the closest-distance side by a predetermined amount. This is because there is a focus detection area indicative of the presence of an object nearer the closest-distance side among the focus detection areas in which the amount of change of the focus evaluation value is equal to or greater than the threshold B. The reason for prioritizing the closest-distance side has been described above.

On the other hand, if the focus detection area in which the amount of change of the focus evaluation value is equal to or greater than the threshold B is only a focus detection area indicative of the presence of an infinitely-distant object (YES in step S13), the processing proceeds to step S15. In step S15, the camera MPU 125 determines whether there is any focus detection area in which the defocus amount has been calculated.

If there is a focus detection area in which the defocus amount has been calculated (YES in step S15), the processing proceeds to step S20 illustrated in FIG. 1A, so as to prioritize a result of the imaging plane phase difference AF over the presence of an infinitely-distant object determined by the focus evaluation value.

If there is no focus detection area in which the defocus amount has been calculated (NO in step S15), the processing proceeds to step S16. In step S16, since information indicating the presence of an object is only based on a change of the focus evaluation value, the camera MPU 125 drives the focus lens 104 toward the infinite-distance side by a predetermined amount using the information. Then, the processing returns to step S3 illustrated in FIG. 1A.

The amount of driving of the focus lens 104 in steps S14 and S16 can be determined in view of the defocus amount detectable by the imaging plane phase difference AF. Although the detectable defocus amount varies depending on objects, the amount of driving of the focus lens 104 is previously set so as not to allow the focus lens 14 to pass over without detecting any object during driving from the focus-undetectable state.

If the absolute value of the amount of change of the focus evaluation value is less than the predetermined threshold B (NO in step S12), the processing proceeds to step S17. In step S17, the camera MPU 125 determines whether there is any focus detection area in which the defocus amount has been calculated. If there is no focus detection area in which the defocus amount has been calculated (NO in step S17), the processing proceeds to step S18. In step S18, the camera MPU 125 drives the focus lens 14 to a predetermined fixed point. Then, the processing proceeds to step S19. In step S19, the camera MPU 125 causes the display device 126 to display an out-of-focus indication, and then ends the AF processing. This corresponds to a case where there is no focus detection area in which the defocus amount has been calculated and there is no focus detection area in which the focus evaluation value has changed between before and after driving of the focus lens 104. In such a case, since there is no information indicating the presence of any object, the camera MPU 125 determines that it is impossible to attain an in-focus state, and then ends the AF processing.

On the other hand, if there is a focus detection area in which the defocus amount has been calculated (YES in step S17), the processing proceeds to step S20 illustrated in FIG. 1A. In steps S20 to S23, the camera MPU 125 corrects the detected defocus amount, and then, in step S24, drives the focus lens 104 to an in-focus position. Then, in step S25, the camera MPU 125 causes the display device 126 to display an in-focus indication, and ends the AF processing.

<Method for Calculating Vertical-Horizontal BP Correction Value)

Next, a method for calculating the vertical-horizontal BP correction value (BP1) in step S20 illustrated in FIG. 1A is described with reference to FIGS. 8 to 10.

Figure 8:
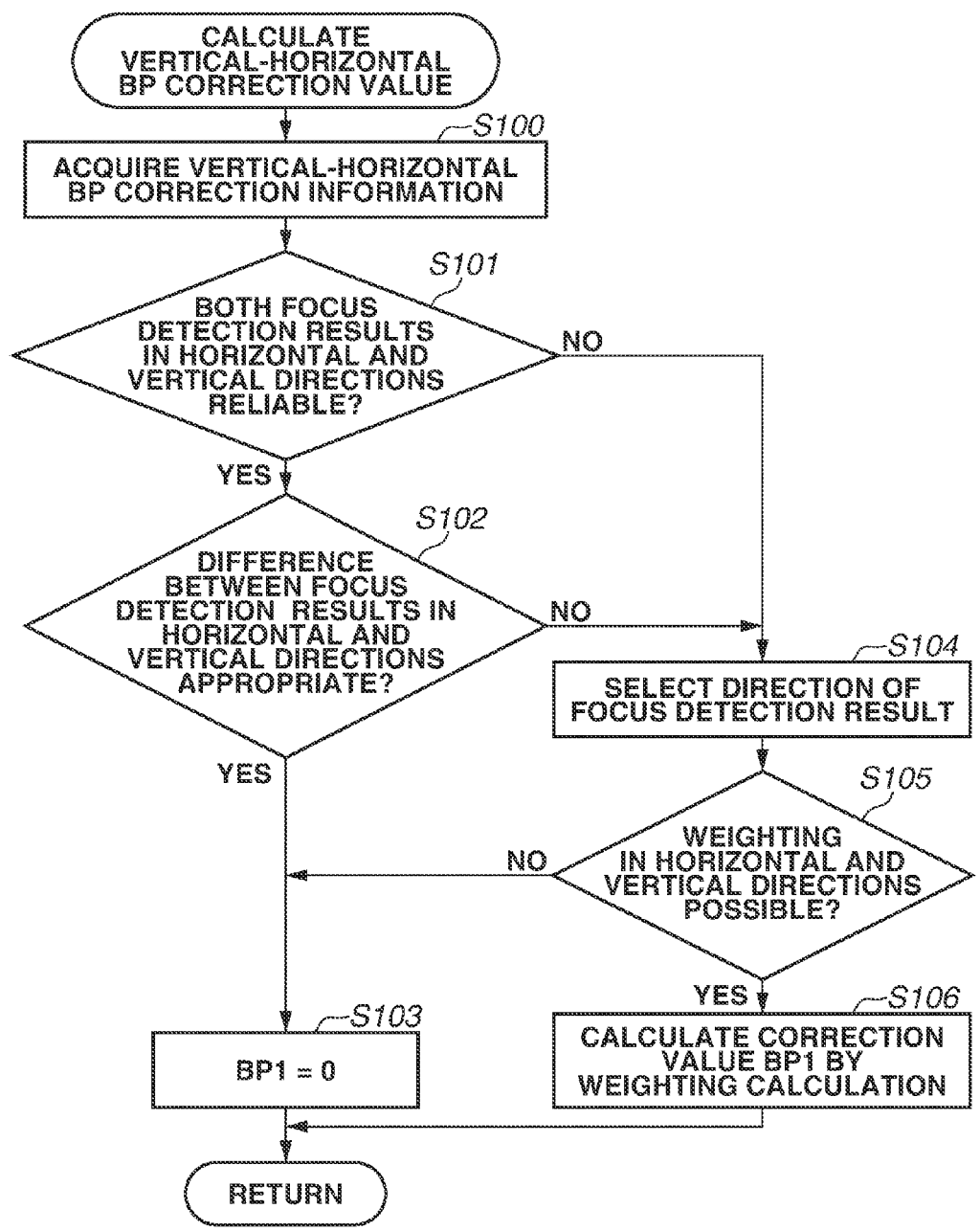
FIG. 8 is a flowchart illustrating a subroutine of the flow for calculating a vertical-horizontal best focus (BP) correction value (BP1) according to the first exemplary embodiment.

FIG. 8 is a flowchart illustrating, in detail, the subroutine of the flow of calculating the vertical-horizontal BP correction value (BP1) in step S20 illustrated in FIG. 1A.

In step S100, the camera MPU 125 acquires vertical-horizontal BP correction information. The vertical-horizontal BP correction information, which is acquired via the lens MPU 117 in response to a request from the camera MPU 125, is information indicating a difference between an in-focus position in the horizontal direction (first direction) and an in-focus position in the vertical direction (second direction).

FIG. 9 illustrates an example of vertical-horizontal BP correction information stored in the lens memory 118. FIG. 9 illustrates correction values corresponding to the central focus detection areas 219a and 218ah illustrated in FIG. 7. Similarly, focus detection correction values corresponding to focus detection areas located at the other two places are stored in the lens memory 118. However, design focus detection correction values are equal between two focus detection areas symmetrical with respect to the optical axis of the imaging optical system.

Accordingly, two tables of focus detection correction values can be stored with respect to three focus detection areas. Furthermore, in a case where a correction value does not vary depending on the position of a focus detection area, a common value may be stored as the correction value.

In the example illustrated in FIG. 9, each of the zoom position and the focus position of the imaging optical system is divided into eight zones, and focus detection correction values BP111 to BP188 are set forth in the respective divided zones. Accordingly, the camera MPU 125 can acquire high-precision correction values according to the positions of the focus lens 104 and the first lens group 101 of the imaging optical system.

Furthermore, the vertical-horizontal BP correction information can be used for both the contrast detection type AF and the phase difference detection type AF.

In step S100, the camera MPU 125 acquires correction information corresponding to the zoom position and the focus position based on a focus detection result targeted for correction.

Then, in step S101, the camera MPU 125 determines whether both a focus detection result obtained in the horizontal direction and a focus detection result obtained in vertical direction are reliable. The method for determining the reliability of a focus detection result has been described above with regard to the phase difference detection type AF and the contrast detection type AF. In the first exemplary embodiment, a case where both the focus detection result in the horizontal direction and the focus detection result in the vertical direction are reliable can occur in the case of the contrast detection type AF.

Therefore, the following description about a vertical-horizontal BP correction value is made based on the contrast detection type AF. However, similar processing can be performed even in a case where focus detection of the phase difference detection type is possible in both the horizontal direction and the vertical direction. If both the focus detection result in the horizontal direction and the focus detection result in the vertical direction are reliable (YES in step S101), the processing proceeds to step S102.

In step S102, the camera MPU 125 determines whether a difference between the focus detection result in the horizontal direction and the focus detection result in the vertical direction is appropriate. This processing is performed to deal with the issue of a near-far composition occurring when both a far-distance object and a near-distance object are contained in the focus detection area.

For example, a case can be considered where an object having contrast in the horizontal direction is present at a far distance and an object having contrast in the vertical direction is present at a near distance.

In that case, a difference, in focus detection result, the absolute value of which is larger than an error caused by astigmatism of the imaging optical system or the sign of which is opposite to the error may occur.

If, in this way, a difference between the focus detection result in the horizontal direction and the focus detection result in the vertical direction is much greater than a criterion value C (NO in step S102), the camera MPU 125 determines that there is a near-far composition and selects one of the horizontal direction and the vertical direction as a direction indicative of a focus detection result nearer the closest-distance side. Then, the processing proceeds to step S104. The criterion vale C can be uniquely defined so as to determine a value improbable as a correction value or can be set using the correction information acquired in step S100.

If it is determined that a difference between the focus detection result in the horizontal direction and the focus detection result in the vertical direction is appropriate (YES in step S102), the processing proceeds to step S103. In step S103, the camera MPU 125 sets the vertical-horizontal BP correction value (BP1) to "0" (BP1=0), and ends the subroutine for vertical-horizontal BP correction value calculation. In this case, the camera MPU 125 performs focus detection using the focus detection results obtained in the horizontal direction and the vertical direction without using any correction value.

In the case of the contrast detection type AF, the camera MPU 125 performs weighting on the focus detection results according to the magnitude relation, such as the ratio between maximum values of focus evaluation values in the horizontal direction and the vertical direction, and obtains a focus detection result by adding the focus detection results in the horizontal direction and the vertical direction. Also in the case of the phase difference detection type AF, the camera MPU 125 can perform weighting on focus detection results using a correlation amount employed in correlation computation.

On the other hand, if only one of the focus detection result in the horizontal direction and the focus detection result in the vertical direction is reliable (NO in step S101), or if only one of the focus detection result in the horizontal direction and the focus detection result in the vertical direction is selected (NO in step S102), the processing proceeds to step S104. In step S104, the camera MPU 125 selects a direction for the focus detection result. More specifically, the camera MPU 125 selects a direction with respect to which a reliable focus detection result has been calculated or a direction with respect to which a focus detection result corresponding to an object nearer the closest-distance side has been calculated.

Then, in step S105, the camera MPU 125 determines whether weighting in the horizontal direction and the vertical direction is possible. In the case of the determination in step S105, although only one or neither of a focus detection result in the horizontal direction and a focus detection result in the vertical direction is reliable from the viewpoint of the reliability of a focus evaluation value or the near-far composition, the camera MPU 125 makes the determination anew for calculating the vertical-horizontal BP correction value in step S105. The details thereof are described below with reference to FIG. 10.

Figure 10:
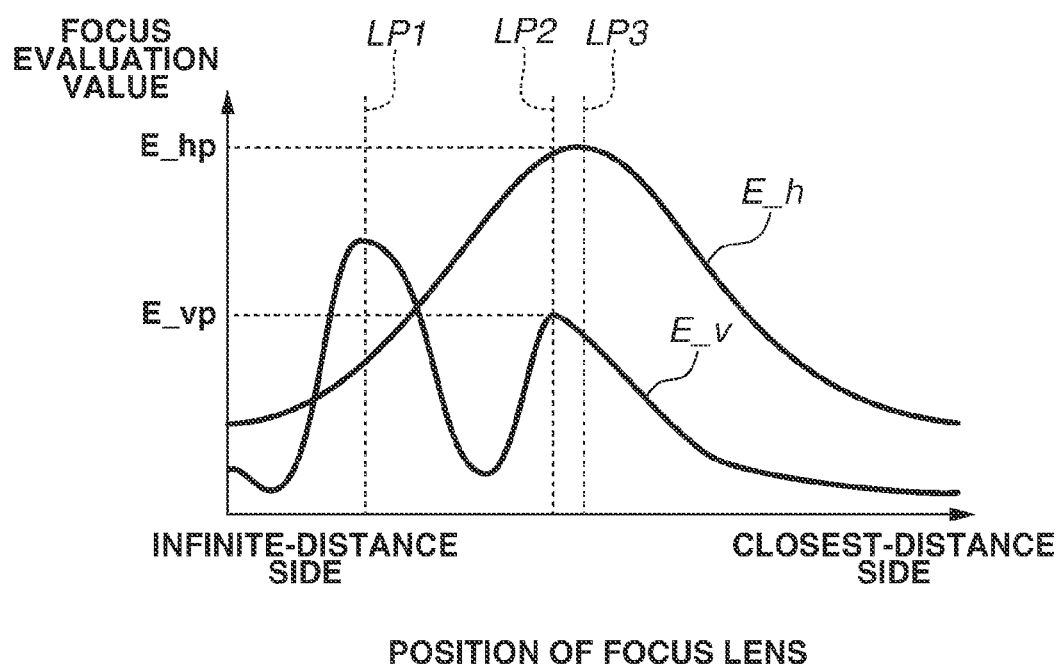
FIG. 10 illustrates a relationship between the position of a focus lens and a focus evaluation value according to the first exemplary embodiment.

FIG. 10 illustrates a relationship between the position of the focus lens 104 and the focus evaluation value in the selected focus detection area. In FIG. 10, curves E_h and E_v represent changes of the focus evaluation value in the horizontal direction and the focus evaluation value in the vertical direction, respectively, which are detected by the contrast detection type AF.

Furthermore, lines LP1, LP2, and LP3 represent the respective positions of the focus lens 104. FIG. 10 illustrates a case where the position LP3 has been obtained as a reliable focus detection result from the focus evaluation value E_h in the horizontal direction and the position LP1 has been obtained as a reliable focus detection result from the focus evaluation value E_v in the vertical direction.

Since the positions LP1 and LP3 of the focus lens 104 greatly differ from each other, in other words, a near-far composition occurs, the focus detection result LP3 in the horizontal direction, which is a focus detection result nearer the closest-distance side, is selected in step S104.

Under such a condition, in step S105, the camera MPU 125 determines whether any focus detection result in the vertical direction is absent in the vicinity of the focus detection result LP3 in the horizontal direction selected in step S104. In the condition illustrated in FIG. 10, the focus detection result LP2 is present (YES in step S105). Therefore, the processing proceeds to step S106, in which the camera MPU 125 calculates a correction value for the focus detection result LP3 while taking the influence of the focus detection result LP2 into consideration.

In step S106, the camera MPU 125 first acquires a value BP1_B, which is an element of the vertical-horizontal BP correction information illustrated in FIG. 9.

Then, the camera MPU 125 calculates a vertical-horizontal BP correction value BP1 using a focus evaluation value E_hp in the horizontal direction in the position LP3 (FIG. 10) and a focus evaluation value E_vp in the vertical direction in the position LP1 (FIG. 10) according to the following formula (2).

$$BP1=BP1\_B \times E\_vp/(E\_vp+E\_hp) \times (+1) \qquad (2)$$

In the first exemplary embodiment, the camera MPU 125 uses formula (2) to calculate the correction value BP1, which is a correction value with respect to a focus detection result in the horizontal direction. However, in the case of correcting a focus detection result in the vertical direction, the camera MPU 125 uses the following formula (3) to calculate the correction value BP1.

$$BP1=BP1\_B \times E\_hp/(E\_vp+E\_hp) \times (-1) \qquad (3)$$

As is apparent from formulae (2) and (3), the camera MPU 125 considers information indicating that the focus evaluation value is large as information indicating that much contrast information is contained in the object, to calculate the vertical-horizontal BP correction value (BP1).

As mentioned in the foregoing, the vertical-horizontal BP correction information is "(the focus detection position of an object having contrast information only in the vertical direction)−(the focus detection position of an object having contrast information only in the horizontal direction)". Therefore, the signs of the correction value BP1 for correcting the focus detection result in the horizontal direction and the correction value BP1 for correcting the focus detection result in the vertical direction are opposite each other. After completing the processing in step S106, the camera MPU 125 ends the subroutine for vertical-horizontal BP correction value calculation.

On the other hand, if no focus detection result in the vertical direction is present in the vicinity of the focus detection result LP3 in the horizontal direction selected in step S104 (NO in step S105), the processing proceeds to step S103. In step S103, since contrast information contained in the object is considered to be generally only in one direction, the camera MPU 125 sets the vertical-horizontal BP correction value (BP1) to "0" (BP1=0). After completing the processing in step S103, the camera MPU 125 ends the subroutine for vertical-horizontal BP correction value calculation.

In this way, since a correction value is calculated based on contrast information in every direction of an object, high-precision correction value calculation associated with the pattern of the object can be performed.

While a case where a near-far composition occurs has been described with reference to FIG. 10, a correction value can be similarly calculated even in a case where only one maximum value is detected in each of the horizontal direction and the vertical direction and one of the focus detection results is unreliable.

Although, in the first exemplary embodiment, a correction value is calculated based on contrast information in every direction of the object in step S105, the method for calculating the correction value is not limited to this calculation method. For example, in a case where focus detection can be performed only in the horizontal direction as focus detection of the phase difference detection type in the first exemplary embodiment, a correction value may be calculated on the supposition that the amount of contrast information in the horizontal direction is equal to that in the vertical direction.

In that case, a correction value can be calculated by substituting "E_hp=E_vp=1" into the above-mentioned formula (2) or (3). With this processing, although correction accuracy may decrease, the load of correction value computation can be reduced.

While, in the foregoing description, processing for a focus detection result of the contrast detection type has been described, similar processing can be performed for a focus detection result of the phase difference detection type. In this case, the amount of change of a correlation amount calculated by a correlation computation of the phase difference detection type can be used as a coefficient for weighting in correction value calculation.

This utilizes the fact that as contrast information of an object is more, for example, as a difference between light and dark of an object is larger or as the number of edges having a light-dark difference is larger, the amount of change of the correlation amount is larger. Various evaluation values, as long as those have the above relationship, may be used instead of the amount of change of the correlation amount.

In this way, correcting a focus detection result using a vertical-horizontal BP correction value enables performing high-precision focus detection regardless of the amount of contrast information in every direction of an object. Furthermore, since correction values in the horizontal direction and the vertical direction are calculated using common correction information such as that illustrated in FIG. 9, the storage capacity for the correction information can be reduced as compared with a case where respective correction values are stored with respect to each direction.

Moreover, in a case where focus detection results in the respective directions greatly differ from each other, the calculation of a vertical-horizontal BP correction value using such focus detection results is not performed, so that the influence of a near-far composition can be reduced. Furthermore, even in a case where a near-far composition is supposed, a correction value is weighted according to the magnitude of a focus evaluation value in every direction, so that high-precision correction can be performed.

In other words, a first evaluation band includes a plurality of evaluation areas, and a focusing unit performs focusing of a recording signal using information obtained by weighting information about image-forming positions in the plurality of evaluation areas.

<Method for Calculating Color BP Correction Value>

Next, a method for calculating the color BP correction value (BP2) in step S21 illustrated in FIG. 1A is described with reference to FIGS. 11, 12A, and 12B.

Figure 11:
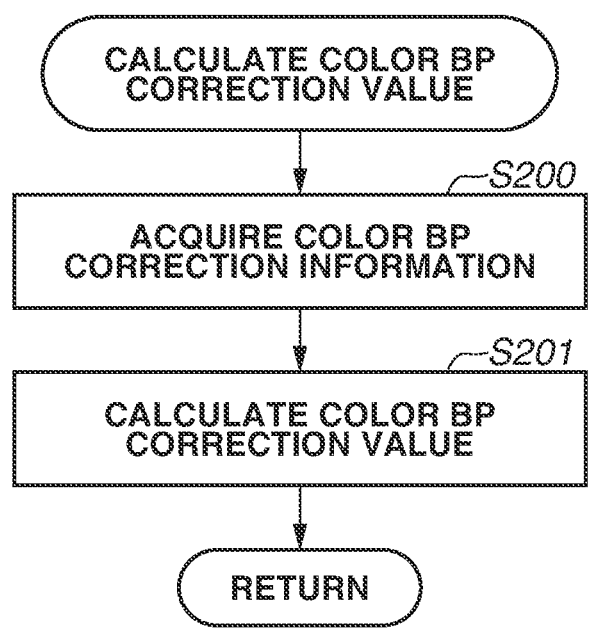
FIG. 11 is a flowchart illustrating a subroutine of the flow for calculating a color BP correction value (BP2) according to the first exemplary embodiment.

FIG. 11 is a flowchart illustrating a subroutine of the flow for calculating the color BP correction value (BP2) in step S21 illustrated in FIG. 1A.

In step S200, the camera MPU 125 acquires color BP correction information. The color BP correction information, which is acquired via the lens MPU 117 in response to a request from the camera MPU 125, is information indicating a difference between an in-focus position detected using a green (G) signal and an in-focus position detected using another color (red (R) or blue (B)) signal.

FIGS. 12A and 12B illustrate examples of vertical-horizontal BP correction information stored in the lens memory 118. FIGS. 12A and 12B illustrate correction values corresponding to the central focus detection areas 219a and 218ah illustrated in FIG. 7. Similarly, focus detection correction values corresponding to focus detection areas located at the other two places are stored in the lens memory 118.

However, design focus detection correction values are equal between two focus detection areas symmetrical with respect to the optical axis of the imaging optical system. Accordingly, two tables of focus detection correction values can be stored with respect to three focus detection areas. Furthermore, in a case where a correction value does not vary depending on the position of a focus detection area, a common value may be stored as the correction value.

In the examples illustrated in FIGS. 12A and 12B, similar to FIG. 9, each of the zoom position and the focus position of the imaging optical system is divided into eight zones, and focus detection correction values BP211 to BP288 and BP311 to BP388 are set forth in the respective divided zones. Accordingly, the camera MPU 125 can acquire high-precision correction values according to the positions of the focus lens 104 and the first lens group 101 of the imaging optical system.

The focus detection correction values BP211 to BP288 illustrated in FIG. 12A each correspond to a difference between a focus detection result detected using output signals of pixels having a green (G) color filter and a focus detection result detected using output signals of pixels having a red (R) color filter.

The focus detection correction values BP311 to BP388 illustrated in FIG. 12B each correspond to a difference between a focus detection result detected using output signals of pixels having a green (G) color filter and a focus detection result detected using output signals of pixels having a blue (B) color filter.

Green (G), red (R), and blue (B) in the first exemplary embodiment mean signals obtained for the respective color filters applied to the above-mentioned pixels on the image sensor. However, the definition of colors is not restrictive. For example, a spectral detection unit for detecting spectral information of an object may be additionally provided, and wavelengths or wavelength regions of green (G), red (R), and blue (B) may be set according to outputs of the spectral detection unit.

Furthermore, the color BP correction information can be used for both the contrast detection type AF and the phase difference detection type AF.

In step S200, the camera MPU 125 acquires correction information corresponding to the zoom position and the focus position based on a focus detection result targeted for correction.

Then, in step S201, the camera MPU 125 calculates a color BP correction value. In a case where a value BP_R, which is an element of the color BP correction information illustrated in FIG. 12A, and a value BP_B, which is an element of the color BP correction information illustrated in FIG. 12B are acquired, the camera MPU 125 calculates a color BP correction value BP2 according to the following formula (4).

$$BP2 = K\_R \times BP\_R + K\_B \times BP\_B \quad (4)$$

Coefficients K_R and K_B are applied to correction information of the respective colors, and are values correlated with the magnitude relationship between green (G) information and red (R) or blue (B) information included in an object. The coefficient K_R takes a large value with respect to an object including much red information, and the coefficient K_B takes a large value with respect to an object including much blue information. Both the coefficients K_R and K_B take small values with respect to an object including much green information.

The coefficients K_R and K_B can be previously set based on typical spectral information of objects. Alternatively, in a case where spectral information of an object can be acquired using a unit for detecting spectra of the object, the coefficients K_R and K_B may be set according to the spectral information of the object. After completion of the calculation of the color BP correction value in step S201, the camera MPU 125 ends the present subroutine.

While, in the first exemplary embodiment, correction values to be used for focus detection are stored as table data for every focus detection area, as illustrated in FIG. 9 and FIGS. 12A and 12B, the method for storing the correction values is not restrictive. For example, when a coordinate system is set such that the origin is an intersection point between the image sensor and the optical axis of the imaging optical system and the X and Y axes are the horizontal and vertical directions of the imaging apparatus, a correction value at the central coordinates of a focus detection area can be obtained based on a function of X and Y values. In this case, the amount of information to be stored as focus detection correction values can be reduced.

Furthermore, in the first exemplary embodiment, a correction value used for focus detection to be calculated using vertical-horizontal BP correction information or color BP correction information is calculated without recourse to spatial frequency information of the pattern of an object. Therefore, high-precision correction can be performed without increasing the amount of correction information to be stored. However, the method for calculating the correction value is not restrictive. Similar to a method for calculating a spatial frequency BP correction value, which is described below, a correction value associated with a spatial frequency component of the object may be calculated using vertical-horizontal BP correction information or color BP correction information for every spatial frequency.

<Method for Calculating Spatial Frequency BP Correction Value>

Next, a method for calculating a spatial frequency BP correction value (BP3) in step S22 illustrated in FIG. 1A is described with reference to FIGS. 13 to 16.

FIG. 13 is a flowchart illustrating, in detail, a subroutine of the flow of calculating a spatial frequency BP correction value (BP3) in step S22 illustrated in FIG. 1A.

In step S300, the camera MPU 125 acquires spatial frequency BP correction information. The spatial frequency BP correction information, which is acquired via the lens MPU 117 in response to a request from the camera MPU 125, is information about an image-forming position of the imaging optical system for every spatial frequency of an object.

Figure 14:
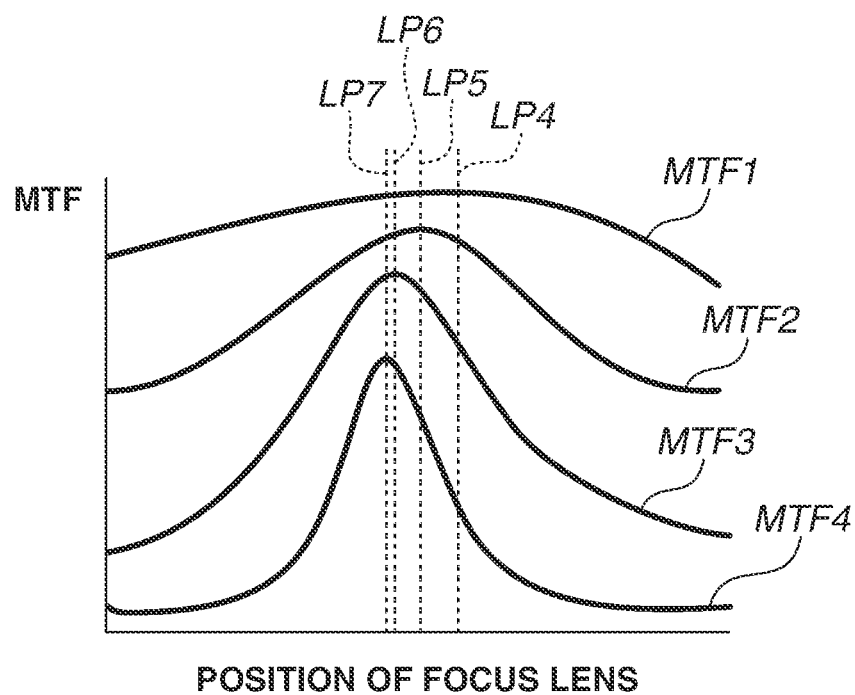
FIG. 14 illustrates a defocus modulation transfer function (MTF) of an imaging optical system according to the first exemplary embodiment.

An example of spatial frequency BP correction information stored in the lens memory 118 is described with reference to FIG. 14. FIG. 14 illustrates a defocus modulation transfer function (MTF) of the imaging optical system. The abscissa axis indicates the position of the focus lens 104, and the ordinate axis indicates the intensity of the MTF. Four curves MTF1, MTF2, MTF3, and MTF4 illustrated in FIG. 14 indicate MTF curves for the respective spatial frequencies, which are arranged in order from the lower frequency to the higher frequency.

The MTF curve of spatial frequency F1 (line pairs per millimeter (LP/mm)) corresponds to the curve MTF1. Similarly, the MTF curves of spatial frequencies F2, F3, and F4 (LP/mm) respectively correspond to the curves MTF2, MTF3, and MTF4. In addition, lines LP4, LP5, LP6, and LP7 indicate the positions of the focus lens 104 respectively corresponding to the maximum values of the defocus MTF curves MTF1, MTF2, MTF3, and MTF4.

Although the defocus MTF curves MTF1, MTF2, MTF3, and MTF4 are illustrated as continuous curves in FIG. 14, the spatial frequency BP correction information stored in the lens memory 118 is information obtained by discretely sampling the curves illustrated in FIG. 14.

In the first exemplary embodiment, with respect to one MTF curve, MTF data is sampled at ten positions of the focus lens 104. For example, with respect to the curve MTF1, ten pieces of data are stored as MTF(n) ($1 \leq n \leq 10$).

Similar to the vertical-horizontal BP correction information and the color BP correction information, the spatial frequency BP correction information is stored for every focus detection area. Furthermore, each of the zoom position and the focus position of the imaging optical system is divided into eight zones, and spatial frequency BP correction information is set forth in the respective divided zones.

Similar to the vertical-horizontal BP correction information and the color BP correction information, the number of focus detection areas and the number of divided zones of each of the zoom position and the focus position can be set arbitrarily. As the set number of areas or zones is increased, the amount of memory required for storage of data is increased, but more high-precision correction can be expected.

Furthermore, the spatial frequency BP correction information can be used for both the contrast detection type AF and the phase difference detection type AF.

In step S300, the camera MPU 125 acquires correction information corresponding to the zoom position and the focus position based on a focus detection result targeted for correction.

Then, in step S301, the camera MPU 125 calculates a band of a signal used for performing focus detection (AF) of the contrast detection type or the phase difference detection type. In the first exemplary embodiment, the camera MPU 125 calculates an AF evaluation band in view of the influences of an object, the imaging optical system, sampling of the image sensor, and a digital filter used for evaluation. A method for calculating the AF evaluation band is described below.

Then, in step S302, the camera MPU 125 calculates a band of a signal used for a captured image. Similar to the calculation of the AF evaluation band in step S301, the camera MPU 125 calculates a captured image evaluation band in view of the influences of an object, the imaging optical system, sampling of the image sensor, and an evaluation band of a viewer of a captured image.

Operations for calculating the AF evaluation band (a second evaluation band of a focusing signal) and the captured image evaluation band (a first evaluation band of a recording signal) are described below with reference to FIGS. 15A, 15B, 15C, 15D, 15E, and 15F. FIGS. 15A to 15F each illustrate the intensity for every spatial frequency, in which the abscissa axis indicates spatial frequency and the ordinate axis indicates intensity.

In a case where the first evaluation band of a recording signal has been switched by a switching unit, the camera MPU 125 changes a correction value for the image-forming position.

Figure 15A:
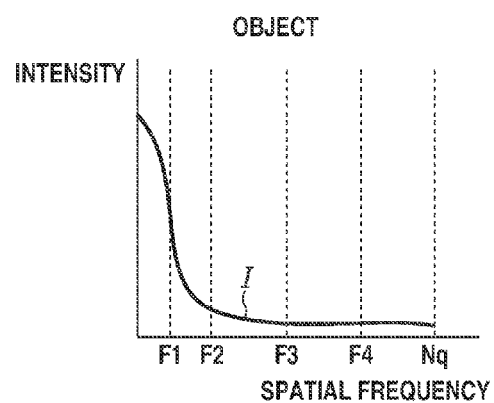
FIGS. 15A, 15B, 15C, 15D, 15E, and 15F illustrate various spatial frequency characteristics according to the first exemplary embodiment.

FIG. 15A illustrates a spatial frequency characteristic (I) of an object. Spatial frequencies F1, F2, F3, and F4 on the abscissa axis respectively correspond to the MTF curves MTF1 to MTF4 illustrated in FIG. 14. In addition, a Nyquist frequency Nq is defined by the pixel pitch of the image sensor. The spatial frequencies F1 to F4 and the Nyquist frequency Nq are also illustrated in FIGS. 15B to 15F, which are described below.

In first exemplary embodiment, the previously stored representative values are used for the spatial frequency characteristic (I) of an object. In FIG. 15A, the spatial frequency characteristic (I) of an object, although being illustrated as a continuous curve, has values that discretely correspond to the spatial frequencies F1, F2, F3, and F4, which are expressed as I(n) ($1 \leq n \leq 4$).

Furthermore, while, in the first exemplary embodiment, the previously stored spatial frequency characteristic (I) of an object is used, a spatial frequency characteristic of an object to be used can be changed according to an object targeted for focus detection. Performing processing, such as fast Fourier transform (FFT) processing, on the captured image signal enables acquiring spatial frequency information of an object.

With such processing, although the content of computation processing increases, a correction value associated with an object targeted for focus detection can be calculated, so that high-precision focusing can be performed. Furthermore, for easier handling, a plurality of previously stored spatial frequency characteristics may be selectively used according to the magnitude of contrast information of an object.

Figure 15D:
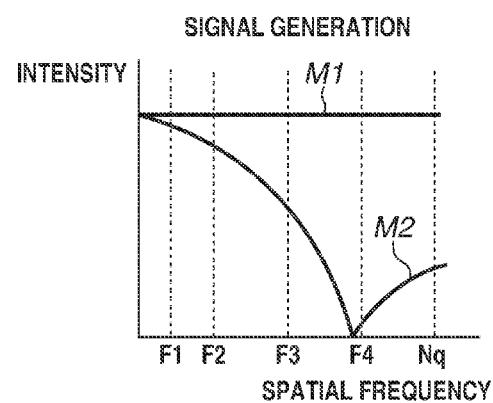
Figure 15B:
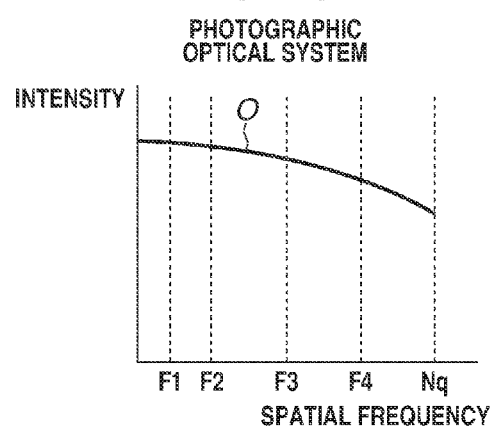

FIG. 15B illustrates a spatial frequency characteristic (O) of the imaging optical system. This information may be acquired via the lens MPU 117 or may be stored in the RAM 125b included in the camera MPU 125. The information to be stored may be a spatial frequency characteristic for every defocus state or may be only a spatial frequency characteristic in an in-focus state.

Since the spatial frequency BP correction value is calculated in the vicinity of an in-focus state, the use of the spatial frequency characteristic in an in-focus state enables performing high-precision correction. However, the use of the spatial frequency characteristic for every defocus state, although increasing computation load, enables performing more high-precision focusing.

A spatial frequency characteristic in which defocus state is to be used may be determined based on the defocus amount obtained by focus detection of the phase difference detection type.

In FIG. 15B, the spatial frequency characteristic (O) of the imaging optical system, although being illustrated as a continuous curve, has values that discretely correspond to the spatial frequencies F1, F2, F3, and F4, which are expressed as O(n) ($1 \leq n \leq 4$).

Figure 15E:
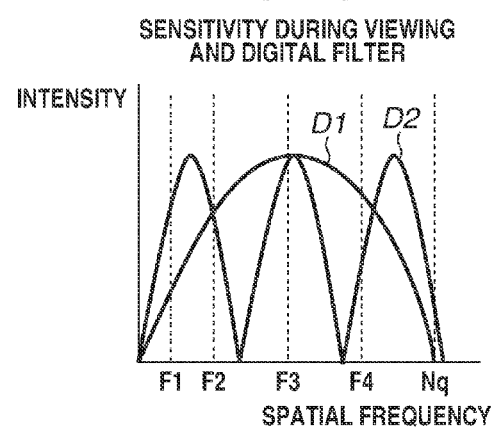
Figure 15C:
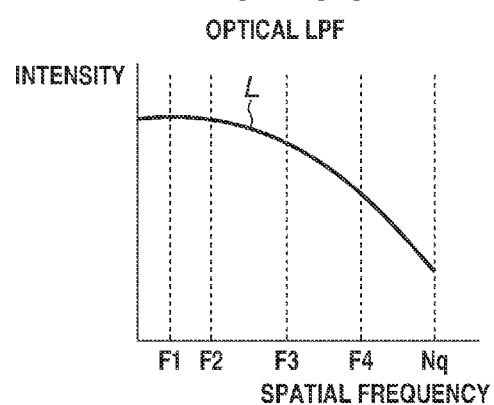

FIG. 15C illustrates a spatial frequency characteristic (L) of the optical low-pass filter 121. This information is stored in the RAM 125b included in the camera MPU 125. In FIG. 15C, the spatial frequency characteristic (L) of the optical low-pass filter 121, although being illustrated as a continuous curve, has values that discretely correspond to the spatial frequencies F1, F2, F3, and F4, which are expressed as L(n) ($1 \leq n \leq 4$).

FIG. 15D illustrates spatial frequency characteristics (M1 and M2) caused by signal generation. As described in the foregoing, the image sensor according to the first exemplary embodiment has two types of readout modes. In the first readout mode, i.e., the full-pixel readout mode, the spatial frequency characteristic does not vary during signal generation.

The line M1 in FIG. 15D indicates the spatial frequency characteristic in the first readout mode. On the other hand, in the second readout mode, i.e., the thinning-out readout mode, the spatial frequency characteristic varies during signal generation. As described in the foregoing, in thinning out the pixels in the X direction, processing for adding signals is performed to improve an S/N ratio. Therefore, the low-pass effect by addition occurs.

The curve M2 in FIG. 15D indicates the spatial frequency characteristic during signal generation in the second readout mode. Here, the low-pass effect by addition is indicated without consideration of the influence of thinning-out.

In FIG. 15D, the spatial frequency characteristics (M1 and M2) caused by signal generation, although being illustrated as continuous curves, have values that discretely correspond to the spatial frequencies F1, F2, F3, and F4, which are expressed as M1($n$) and M2($n$) ($1 \leq n \leq 4$).

FIG. 15E illustrates a spatial frequency characteristic (D1) indicating the sensitivity for every spatial frequency in viewing a captured image and a spatial frequency characteristic (D2) of a digital filter used in processing an AF evaluation signal.

The sensitivity for every spatial frequency in viewing a captured image is affected by the individual difference of a viewer or the viewing environments, such as image size, viewing distance, and brightness. In the first exemplary embodiment, the sensitivity for every spatial frequency during viewing is set and stored as typical values.

The viewing distance means a distance from the user to a display on which to display a recorded image or a distance from the user to a sheet of paper on which to print a recorded image.

On the other hand, during the second readout mode, aliasing noise of frequency components of signals occurs due to the influence of thinning-out. The curve D2 indicates a spatial frequency characteristic of the digital filter in consideration of that influence.

In FIG. 15E, the spatial frequency characteristic (D1) during viewing and the spatial frequency characteristic (D2) of the digital filter, although being illustrated as continuous curves, have values that discretely correspond to the spatial frequencies F1, F2, F3, and F4, which are expressed as D1($n$) and D2($n$) ($1 \leq n \leq 4$).

As described above, since various pieces of information are stored in any one of the camera body 120 and the lens unit 100, the camera MPU 125 calculates an evaluation band W1 of a captured image and an AF evaluation band W2 using the following formulae (5) and (6).

$$W1(n) = I(n) \times O(n) \times L(n) \times M1(n) \times D1(n) \quad (1 \leq n \leq 4) \tag{5}$$

$$W2(n) = I(n) \times O(n) \times L(n) \times M2(n) \times D2(n) \quad (1 \leq n \leq 4) \tag{6}$$

Figure 15F:
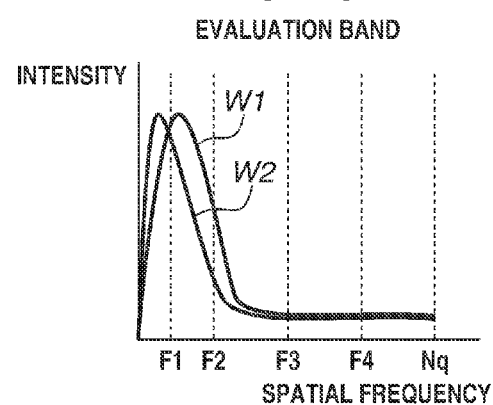

FIG. 15F illustrates an evaluation band W1 of a captured image (a first evaluation band of a recording signal) and an AF evaluation band W2 (a second evaluation band of a focusing signal). Performing calculation using formulae (5) and (6) enables quantifying what degree of influence the factors for determining an in-focus state of the captured image have for every spatial frequency. Similarly, it enables specifying what degree of influence the error included in a focus detection result has for every spatial frequency.

Furthermore, the information stored in the camera body 120 may include the previously calculated evaluation bands W1 and W2. As described in the foregoing, with calculation performed during each correction, a flexibly adjusted correction value can be calculated when the digital filter used for AF evaluation has been changed.

On the other hand, if such information is previously stored, calculations such as those using formulae (5) and (6) can be omitted or the amount of storage of various pieces of data can be reduced.

Furthermore, not all of the calculations need to be completed in advance. Therefore, for example, if only spatial frequency characteristics of the imaging optical system and an object may be previously calculated and stored in the camera to reduce the amount of storage of data or to reduce the amount of computation.

For ease of description, four spatial frequencies (F1 to F4) are illustrated in FIGS. 15A to 15F. However, the larger the number of spatial frequencies providing data, the more accurately the spatial frequency characteristics of the captured image evaluation band and the AF evaluation band can be reproduced, thus enabling calculating high-precision correction values.

On the other hand, if the number of spatial frequencies on which to perform weighting is decreased, the amount of computation can be reduced. Only two spatial frequencies that respectively represent the spatial frequency characteristics of the captured image evaluation band and the AF evaluation band may be provided to be used for subsequent computations.

Referring back to FIG. 13, the description of the content of the subroutine is continued.

In step S303, the camera MPU 125 calculates a spatial frequency BP correction value (BP3). To calculate the spatial frequency BP correction value, the camera MPU 125 first calculates a defocus MTF of the captured image (C1) and a defocus MTF of the focus detection signal (C2).

The camera MPU 125 calculates the defocus MTFs C1 and C2 using the defocus MTF information acquired in step S300 and the evaluation bands W1 and W2 calculated in steps S302 and S301 according to the following formulae (7) and (8).

$$C1(n) = MTF1(n) \times W1(1) + MTF2(n) \times W1(2) + MTF3(n) \times W1(3) + MTF4(n) \times W1(4) \tag{7}$$

$$C2(n) = MTF1(n) \times W2(1) + MTF2(n) \times W2(2) + MTF3(n) \times W2(3) + MTF4(n) \times W2(4) \tag{8}$$

In formulae (7) and (8), the defocus MTFs for the respective spatial frequencies illustrated in FIG. 14 are weighted with the captured image and AF evaluation bands calculated in steps S302 and S301 and are then added to obtain the captured image defocus MTF C1 and the AF defocus MTF C2.

Figure 16:
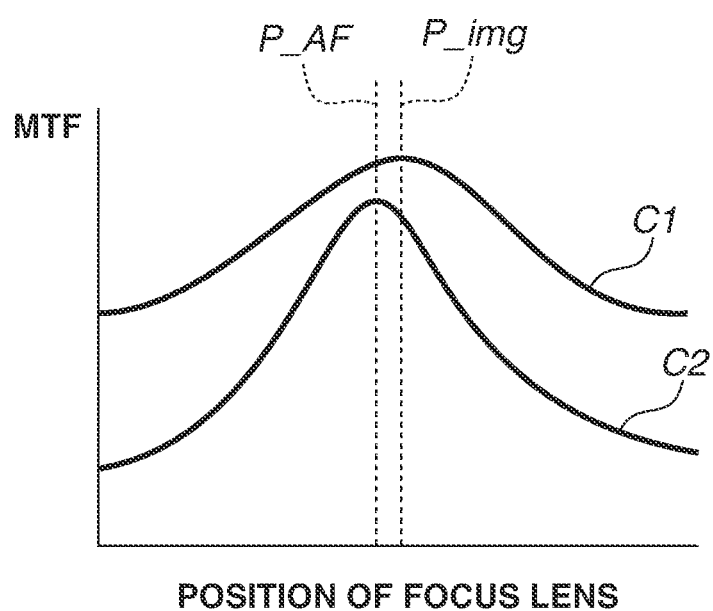
FIG. 16 illustrates a defocus MTF with an evaluation band of a captured image and an evaluation band of AF taken into consideration according to the first exemplary embodiment.

FIG. 16 illustrates the obtained two defocus MTFs C1 and C2. The abscissa axis indicates the position of the focus lens 104, and the ordinate axis indicates the value of an MTF obtained by weighting for every spatial frequency and adding.

The camera MPU 125 serves as an imaging-position calculation unit to detect the maximum value positions of the respective MTF curves C1 and C2. Thus, a first imaging-position P_img is detected as the position of the focus lens 104 corresponding to the maximum value of the curve C1. A second imaging-position P_AF is detected as the position of the focus lens 104 corresponding to the maximum value of the curve C2.

In step S303, the camera MPU 125 calculates the spatial frequency BP correction value (BP3) according to the following formula (9).

$$BP3 = P\_AF - P\_img \tag{9}$$

The formula (9) enables correcting a best focus correction value (BP correction value) used to correct an error that may occur between an in-focus position for a captured image and an in-focus position detected by AF. As mentioned in the above description, the in-focus position for a captured image changes with a spatial frequency characteristic of an object, a spatial frequency characteristic of an imaging optical system, a spatial frequency characteristic of an optical low-pass filter, a spatial frequency characteristic during signal generation, and a spatial frequency characteristic indicating a sensitivity for every frequency during viewing.

In addition, the in-focus position for a captured image also changes with the content of image processing. In the first exemplary embodiment, since the spatial frequency characteristic is previously calculated during generation of a captured image, an in-focus position of the captured image can be calculated with high accuracy.

For example, the camera MPU 125 changes an in-focus position of the captured image according to a recording size used for recording the captured image, super-resolution processing or sharpness performed in image processing, or a display size. Furthermore, the camera MPU 125 affects an evaluation band of a viewer according to at what image size or enlargement ratio the captured and recorded image is to be viewed or according to a viewing distance for viewing the image, if known in advance.

The camera MPU 125 sets the evaluation band of a viewer to a characteristic in which a high-frequency component is emphasized, as the image size is larger or the viewing distance is shorter. This causes a change of the in-focus position of the captured image.

The camera MPU 125 changes a first evaluation band of a recording signal according to an interval of pixels of the image sensor for the recording signal and signal addition processing of the recording signal performed in the image sensor.

Furthermore, the camera MPU 125 changes the first evaluation band of the recording signal according to signal thinning-out processing of the recording signal performed in the image sensor and the content of image processing performed on the recording signal.

Moreover, the camera MPU 125 changes the first evaluation band of the recording signal according to an image size of the recording signal and a display size of the recording signal.

Additionally, the camera MPU 125 changes the first evaluation band of the recording signal according to a viewing distance for the recording signal and an image brightness of the recording signal.

Similarly, the camera MPU 125 changes a second evaluation band of a focusing signal according to an interval of pixels of the image sensor for the focusing signal.

Furthermore, the camera MPU 125 changes the second evaluation band of the focusing signal according to signal addition processing of the recording signal performed in the image sensor, signal thinning-out processing of the recording signal performed in the image sensor, and the content of filter processing performed on the focusing signal.

On the other hand, the camera MPU 125 also changes an in-focus position, which is to be detected by AF, according to a spatial frequency characteristic of an object, a spatial frequency characteristic of an imaging optical system, a spatial frequency characteristic of an optical low-pass filter, a spatial frequency characteristic during signal generation, and a spatial frequency characteristic of a digital filter used for AF evaluation. In the first exemplary embodiment, the camera MPU 125 calculates the spatial frequency characteristic in advance in the process of generation of signals used for AF, and thus can calculate the in-focus position to be detected by AF with a high degree of accuracy.

For example, the camera MPU 125 can flexibly deal with even a case where AF is performed in the first readout mode. In that case, the camera MPU 125 can change the spatial frequency characteristic during signal generation to a characteristic compatible with the first readout mode to calculate weighting coefficients.

Furthermore, since the imaging apparatus described in the first exemplary embodiment is an interchangeable-lens type single-lens reflex camera, the lens unit 100 is interchangeable. When the lens unit 100 has been replaced with an interchangeable lens, the interchangeable lens transmits, to the camera body 102, defocus MTF information corresponding to every spatial frequency of an imaging optical system. Accordingly, the camera MPU 125 can calculate a high-precision correction value for every compatible interchangeable lens.

The lens unit 100 may transmit, to the camera body 120, not only the defocus MTF information but also information such as the spatial frequency characteristic of an imaging optical system. Such information can be utilized in a method described above.

Furthermore, similarly, even when the camera body 120 has been replaced, the pixel pitch or the characteristic of an optical low-pass filter may change. Even in such a case, as described above, a correction value associated with the characteristic of the camera body 120 can be calculated to perform high-precision correction.

In the above description, the camera MPU 125 serves as a calculation unit to mainly calculate a correction value. However, the calculation unit is not limited to the camera MPU 125. For example, the lens MPU 117 can calculate a correction value. In that case, the camera MPU 125 transmits, to the lens MPU 117, various pieces of information described with reference to FIGS. 15A to 15F, and the lens MPU 117 calculates a correction value using information such as defocus MTFs. Then, the lens MPU 117 performs correction on the in-focus position transmitted from the camera MPU 125 in step S24 illustrated in FIG. 1A, and drives the focus lens 104 to the corrected in-focus position.

In the present exemplary embodiment, a correction value for AF is calculated in consideration of characteristics (vertical-horizontal, color, and spatial frequency bands) of signals used for focus detection. Therefore, a correction value can be calculated in a similar method regardless of AF types. Since correction methods and data used for correction do not need to be provided for every AF type, the amount of storage of data and the load of computation can be reduced.

Next, a second exemplary embodiment of the present invention is described with reference to FIG. 17. The second exemplary embodiment differs from the first exemplary embodiment mainly in the method for calculating a spatial frequency BP correction value. In the first exemplary embodiment, the defocus MTF information is used as values indicating a characteristic for every spatial frequency of the imaging optical system.

However, since the defocus MTF information is large in the amount of data and requires the large amount of storage and the large load of computation, in the second exemplary embodiment, the camera MPU 125 calculates the spatial frequency BP correction value using maximum value information of the defocus MTF.

This can reduce the amount of storage of data in the lens memory 118, reduce the amount of communications between the lens unit 100 and the camera body 120, and reduce the load of computation performed by the camera MPU 125.

The configuration of the first exemplary embodiment described with reference to the block diagram (FIG. 2) of the imaging apparatus and the explanatory diagrams (FIGS. 3 to 6) of the focus detection types is similar to that of the second exemplary embodiment, the description of which is, therefore, not repeated.

Furthermore, the configuration of the first exemplary embodiment described with reference to the explanatory diagram (FIG. 7) of the focus detection areas, the flowcharts (FIGS. 1A and 1B) of the focus detection processing, and the calculation method for various BP correction values (FIG. 8 to FIGS. 12A and 12B) is similar to that of the second exemplary embodiment, the description of which is, therefore, not repeated.

Moreover, the configuration of the first exemplary embodiment described with reference to the subroutine (FIG. 13) for calculation of the spatial frequency BP correction value and the explanatory diagrams (FIGS. 15A to 15F) of the evaluation bands is similar to that of the second exemplary embodiment, the description of which is, therefore, not repeated.

A subroutine of the flow of calculating a spatial frequency BP correction value (BP3) in the second exemplary embodiment is described below with reference to FIG. 13.

In step S300, the camera MPU 125 acquires spatial frequency BP correction information.

The spatial frequency BP correction information stored in the lens memory 118 illustrated in FIG. 2, which is different from that in the first exemplary embodiment, is described below with reference to FIG. 17.

Figure 17:
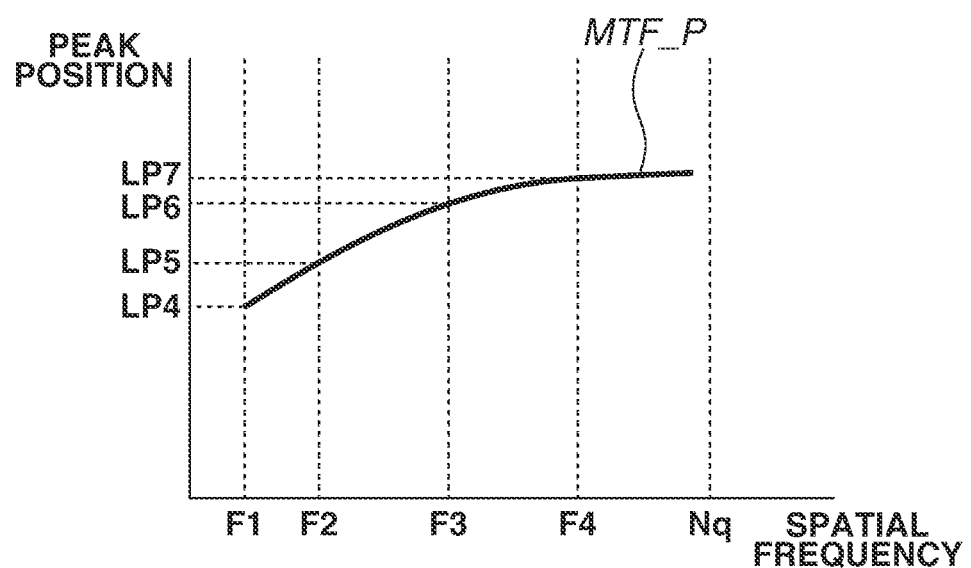
FIG. 17 illustrates information about a maximum value of a defocus MTF of an imaging optical system according to a second exemplary embodiment of the present invention.

FIG. 17 illustrates the positions of the focus lens 104 indicating the maximum values of the defocus MTF for every spatial frequency, which is a characteristic of the imaging optical system. Lens positions LP4, LP5, LP6, and LP7, which correspond to the maximum values of the defocus MTF for the respective spatial frequencies F1 to F4 illustrated in FIGS. 15A to 15F, are indicated on the ordinate axis in FIG. 17. In the second exemplary embodiment, four pieces of data are stored as MTF_P(n) (1≤n≤4) in the lens memory 118. The stored information corresponds to the position of a focus detection area, the zoom position, and the focus position, as described in the first exemplary embodiment.

In the subroutine for calculating a spatial frequency BP correction value according to the second exemplary embodiment, in step S300, the camera MPU 125 acquires correction information corresponding to the zoom position and the focus position associated with a focus detection result targeted for correction.

Then, in steps S301 and S302, the camera MPU 125 performs processing similar to that in the first exemplary embodiment.

Then, in step S303, the camera MPU 125 calculates a spatial frequency BP correction value (BP3). To calculate the spatial frequency BP correction value, the camera MPU 125 first calculates an in-focus position (P_img) of the captured image and an in-focus position (P_AF) detected by AF using the defocus MTF information acquired in step S300 and the evaluation bands W1 and W2 calculated in steps S302 and S301 according to the following formulae (10) and (11).

$$P\_img = MTF\_P(1) \times W1(1) + MTF\_P(2) \times W1(2) + MTF\_P(3) \times W1(3) + MTF\_P(4) \times W1(4) \quad (10)$$

$$P\_AF = MTF\_P(1) \times W2(1) + MTF\_P(2) \times W2(2) + MTF\_P(3) \times W2(3) + MTF\_P(4) \times W2(4) \quad (11)$$

In formulae (10) and (11), the maximum value information of the defocus MTF for the respective spatial frequencies illustrated in FIG. 17 is weighted with the captured image and AF evaluation bands calculated in steps S302 and S301. Then, the in-focus position (P_img) of the captured image and the in-focus position (P_AF) detected by AF are calculated.

In step S303, the camera MPU 125 calculates the spatial frequency BP correction value (BP3) according to the following formula, as in the first exemplary embodiment.

$$BP3 = P\_AF - P\_img \quad (9)$$

The above-described processing enables calculating the spatial frequency BP correction value. While, in the first exemplary embodiment, using the defocus MTF information enables calculating a more high-precision correction value, the configuration of the second exemplary embodiment enables reducing the amount of data to be stored in the lens memory 118, reducing the amount of communications between the lens unit 100 and the camera body 120, and reducing the load of computation performed by the camera MPU 125.

Next, a third exemplary embodiment of the present invention is described with reference to FIG. 18. The third exemplary embodiment differs from the first exemplary embodiment mainly in the method for calculating a spatial frequency BP correction value. In the first exemplary embodiment, the defocus MTF information is used as values indicating a characteristic for every spatial frequency of the imaging optical system, and a correction value is calculated each time focus detection is performed.

However, since the calculation of the vertical-horizontal BP correction value involves the large amount of data to be handled and requires the large amount of storage and the large load of computation, in the third exemplary embodiment, the camera MPU 125 does not calculate the vertical-horizontal BP correction value if there is no need to calculate the vertical-horizontal BP correction value. This can reduce the amount of communications between the lens unit 100 and the camera body 120 and reduce the load of computation performed by the camera MPU 125.

The configuration of the first exemplary embodiment described with reference to the block diagram (FIG. 2) of the imaging apparatus, the explanatory diagrams (FIGS. 3 to 6) of the focus detection types, and the explanatory diagram (FIG. 7) of the focus detection areas is similar to that of the third exemplary embodiment, the description of which is, therefore, not repeated.

Furthermore, the configuration of the first exemplary embodiment described with reference to the flowcharts (FIGS. 1A and 1B) of the focus detection processing and the calculation method for various BP correction values (FIG. 8 to FIGS. 12A and 12B) is similar to that of the third exemplary embodiment, the description of which is, therefore, not repeated.

Furthermore, the configuration of the first exemplary embodiment described with reference to the explanatory diagrams (FIGS. 14 to 16) used in calculating the vertical-horizontal BP correction value is similar to that of the third exemplary embodiment, the description of which is, therefore, not repeated.

The subroutine for calculating a spatial frequency BP correction value (BP3) according to the third exemplary embodiment, which is different from that in the first exemplary embodiment, is described below with reference to FIG.

18. In FIG. 18, steps for performing operations similar to those in FIG. 13 are assigned the same step numbers, and are, therefore, omitted from description.

FIG. 18 is a flowchart illustrating a subroutine of the flow for calculating a spatial frequency BP correction value (BP3), which is the details of processing performed in step S22 in FIG. 1A, according to the third exemplary embodiment.

In step S3000, the camera MPU 125 determines whether to calculate a correction error. As understood from the description in the first exemplary embodiment, the more analogous the evaluation band of a captured image and the AF evaluation band are, the smaller a correction value becomes. Therefore, according to the third exemplary embodiment, if it is known in advance that a difference between the two evaluation bands is less than a predetermined value, the camera MPU 125 omits calculation of any correction value.

Thus, if a difference between the first evaluation band and the second evaluation band is less than a predetermined value, the camera MPU 125 does not calculate any correction value.

If the difference between the first evaluation band and the second evaluation band is equal to or greater than the predetermined value, the camera MPU 125 corrects a correction value using information about the first evaluation band of a recording signal and information about the second evaluation band of a focusing signal.

More specifically, in the spatial frequency characteristics caused by signal generation, if the signal used for AF is also a signal read out in the first readout mode, the evaluation band of a captured image and the AF evaluation band become equal.

Additionally, if a digital filter having a spatial frequency characteristic similar to the spatial frequency characteristic indicating the sensitivity for every spatial frequency during viewing of a captured image is used for processing an AF evaluation signal, the spatial frequency characteristic during viewing and the spatial frequency characteristic of the digital filter become equal.

Such a situation occurs, for example, in a case where an image to be displayed on the display device 126 is magnified and displayed.

Furthermore, similarly, even in a case where a captured image is generated from a signal read out in the second readout mode, it is supposed that the evaluation band of a captured image and the AF evaluation band become equal.

In such a case, the camera MPU 125 determines in step S3000 that there is no need to calculate any correction value. Then, the processing proceeds to step S3001.

In step S3001, the camera MPU 125 assigns "0" to the spatial frequency BP correction value (BP3), and then ends the subroutine for calculating the spatial frequency BP correction value (BP3).

On the other hand, the subsequent processing performed in a case where it is determined that a correction value needs to be calculated is similar to that in the first exemplary embodiment, and is, therefore, omitted from description.

The above-described configuration enables omitting processing when no spatial frequency BP correction value (BP3) needs to be calculated. This can reduce the amount of communication of data and reduce the load of computation.

Furthermore, while, in the third exemplary embodiment, a description has been made about a spatial frequency BP correction value, a similar description can apply to a vertical-horizontal BP correction value and a color BP correction value. For example, in a case where focus detection is performed in the vertical direction and the horizontal direction, the calculation of a vertical-horizontal BP correction value may be omitted. Additionally, in a case where a color signal used for a captured image is equal to a color signal used for focus detection, the calculation of a color BP correction value may be omitted.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

According to exemplary embodiments of the present invention, correcting a difference in focusing state between a captured image and a focus detection result, which is a focus detection error, enables performing more high-precision focusing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A focusing adjustment apparatus comprising:
    an image sensor configured to capture an object image, formed by an imaging optical system having a focus lens, and to output an image signal;
    one or more processors; and
    memory storing instructions that, when executed by the one or more processors, cause the focusing adjustment apparatus to perform operations including:
    outputting a focus detection result based on the image signal output from the image sensor for a focusing operation,
    acquiring first information, which is related to characteristics of a signal used for outputting the focus detection result, and acquiring second information, which is related to characteristics of an image to be captured,
    acquiring third information on aberrations of the imaging optical system,
    calculating a correction value based on the first information, the second information, and the third information, and correcting the focus detection result by using the calculated correction value, and
    controlling movement of the focus lens based on the corrected focus detection result.

2. The focusing adjustment apparatus according to claim 1, wherein the first information and the second information are predetermined.

3. The focusing adjustment apparatus according to claim 1, wherein the third information includes information on a plurality of image-forming positions corresponding to maximum values of modulation transfer function (MTF) corresponding to different spatial frequencies, respectively.

4. The focusing adjustment apparatus according to claim 1, wherein the third information includes, for each spatial frequency, information on an image-forming position of the imaging optical system including the focus lens.

5. The focusing adjustment apparatus according to claim 4, wherein the first information includes information on an assumed spatial frequency of an autofocus (AF) image signal and the second information is information on an assumed spatial frequency of a signal for the image to be captured.

6. The focusing adjustment apparatus according to claim 5, wherein calculating includes calculating the correction value based on (i) a result of calculating an image-forming position corresponding to the assumed spatial frequency of the AF image signal using, for each spatial frequency of the object, information on an image-forming position of the imaging optical system including the focus lens and (ii) a result of calculating an image-forming position corresponding to the assumed spatial frequency of the signal for the image to be captured using, for each spatial frequency of the object, information on an image-forming position of the imaging optical system including the focus lens.

7. The focusing adjustment apparatus according to claim 6, wherein the assumed spatial frequency of the AF image signal and the assumed spatial frequency of the signal for the image to be captured are each composed of a plurality of spatial frequencies, and the assumed spatial frequency of the AF image signal and the assumed spatial frequency of the signal for the image to be captured are each calculated by weighting and adding the image-forming position of the focus lens for each spatial frequency of the object based on intensity of each of the plurality of spatial frequencies.

8. The focusing adjustment apparatus according to claim 1, wherein the first information is based on at least one of a spatial frequency characteristic of an object (I), a spatial frequency characteristic of a photographic optical system (O), a spatial frequency characteristic of an optical low-pass filter (L), a spatial frequency characteristic in a first readout mode (M1), and a spatial frequency characteristic indicating a sensitivity for every spatial frequency in viewing a captured image (D1).

9. The focusing adjustment apparatus according to claim 1, wherein the second information is based on at least one of a spatial frequency characteristic of an object (I), a spatial frequency characteristic of a photographic optical system (O), a spatial frequency characteristic of an optical low-pass filter (L), a spatial frequency characteristic in a second readout mode (M2), and a spatial frequency characteristic of a digital filter for autofocus (AF) evaluation (D2).

10. The focusing adjustment apparatus according to claim 1, wherein the first information is based on at least one of an interval between pixels of the image sensor, addition processing performed in the image sensor, thinning-out processing performed in the image sensor, and filter processing for autofocus (AF) evaluation.

11. The focusing adjustment apparatus according to claim 1, wherein the second information is based on at least one of an interval between pixels of the image sensor, a readout mode for a signal of the image sensor, addition processing of an image, thinning-out processing of an image, a content of image processing performed on an image, an image size of an image for recording, a display size of an image for recording, a viewing distance for an image for recording, and an image brightness of an image for recording.

12. The focusing adjustment apparatus according to claim 1, wherein the second information is based on at least one of an interval between pixels of the image sensor, a readout mode for a signal of the image sensor, addition processing of an image, thinning-out processing of an image, a content of image processing performed on an image, an image size of an image for recording, a display size of an image for recording, a viewing distance for an image for recording, and an image brightness of an image for recording.

13. An imaging optical system including a focus lens comprising:
a storage configured to store information regarding an astigmatism, a chromatic aberration, and a spherical aberration of the imaging optical system,
wherein the information includes, for each spatial frequency, information on an image-forming position of the imaging optical system including the focus lens.

14. The imaging optical system according to claim 13, wherein the information includes information on a plurality of image-forming positions corresponding to maximum values of modulation transfer function (MTF) corresponding to different spatial frequencies, respectively,
wherein the plurality of image-forming positions are sampled from MTF curves.

15. The imaging optical system according to claim 13, wherein the imaging optical system is detachable to a focusing adjustment apparatus, and the information includes information which corresponds to a focus lens position and a zoom lens position according to a focus detection result by focusing adjustment apparatus.

16. A focusing adjustment method for a focusing adjustment apparatus having an image sensor, the focusing adjustment method comprising:
capturing, via the image sensor, an object image, formed by an imaging optical system having a focus lens, and outputting an image signal;
outputting a focus detection result based on the image signal output from the image sensor for a focusing operation;
acquiring first information, which is related to characteristics of a signal used for outputting the focus detection result, and acquiring second information, which is related to characteristics of an image to be captured;
acquiring third information on aberrations of the imaging optical system;
calculating a correction value based on the first information, the second information, and the third information, and correcting the focus detection result by using the calculated correction value; and
controlling movement of the focus lens based on the corrected focus detection result.

17. A focusing adjustment apparatus comprising:
an image sensor configured to capture an object image, formed by an imaging optical system having a focus lens, and to output an image signal;
one or more processors; and
memory storing instructions that, when executed by the one or more processors, cause the focusing adjustment apparatus to perform operations including:
outputting a focus detection result based on the image signal output from the image sensor for a focusing operation,
acquiring first information, which is related to a relationship between characteristics of a signal used for acquiring the focus detection result and characteristics of a signal of an image to be captured, acquiring second information on aberrations of the imaging optical system, calculating a correction value based on the first information and the second information, and correcting the focus detection result by using the calculated correction value, and controlling movement of the focus lens based on the corrected focus detection result.

18. The focusing adjustment apparatus according to claim 17, wherein the first information is predetermined.

19. The focusing adjustment apparatus according to claim 17, wherein the second information includes information on a plurality of image-forming positions corresponding to maximum values of modulation transfer function (MTF) corresponding to different spatial frequencies, respectively.

20. The focusing adjustment apparatus according to claim 17, wherein the second information includes, for each spatial frequency, information on an image-forming position of the imaging optical system including the focus lens.

21. A focusing adjustment method for a focusing adjustment apparatus including an image sensor for performing photoelectric conversion on a luminous flux having passed through an imaging optical system including a focus lens and performing output of an image signal, the focusing adjustment method comprising:

outputting a focus detection result based on the image signal output from the image sensor for a focusing operation;

acquiring first information, which is related to a relationship between characteristics of a signal used for acquiring the focus detection result and characteristics of a signal of an image to be captured;

acquiring second information on aberrations of the imaging optical system;

calculating a correction value based on the first information and the second information, and correcting the focus detection result by using the calculated correction value; and controlling movement of the focus lens based on the corrected focus detection result.

* * * * *